US012759334B2

(12) United States Patent
Miyajima

(10) Patent No.: US 12,759,334 B2
(45) Date of Patent: Oct. 13, 2026

(54) IMAGE FORMING APPARATUS, METHOD FOR CONTROLLING THE SAME, AND STORAGE MEDIUM

(71) Applicant: CANON KABUSHIKI KAISHA, Tokyo (JP)

(72) Inventor: Jun Miyajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/778,712

(22) Filed: Jul. 19, 2024

(65) Prior Publication Data

US 2025/0036060 A1 Jan. 30, 2025

(30) Foreign Application Priority Data

Jul. 25, 2023 (JP) ................................ 2023-120926

(51) Int. Cl.
*B42C 9/00* (2006.01)
*G03G 15/00* (2006.01)
*G03G 15/01* (2006.01)

(52) U.S. Cl.
CPC ....... *B42C 9/0081* (2013.01); *G03G 15/0121* (2013.01); *G03G 15/0189* (2013.01); *G03G 15/6541* (2013.01); *G03G 2215/00835* (2013.01)

(58) Field of Classification Search
CPC ........... G03G 15/6544; G03G 15/6541; G03G 2215/00835; B42C 9/0081; B42C 1/12; B42C 9/0093
See application file for complete search history.

(56) References Cited

U.S. PATENT DOCUMENTS 4,908,663 A * 3/1990 Gunji ................ G03G 15/0855 399/388
5,582,570 A * 12/1996 Crowley .............. B42C 9/0093 493/320
2006/0222389 A1* 10/2006 Kin .................... G03G 15/0173 399/49
2010/0214581 A1* 8/2010 Shiraki ................ H04N 1/6033 358/1.9
2011/0287357 A1* 11/2011 Kwarta .............. G03G 15/6544 430/124.2

FOREIGN PATENT DOCUMENTS

JP 2004209859 A 7/2004
JP 2013043751 A 3/2013

* cited by examiner

*Primary Examiner* — Jessica L Eley
(74) *Attorney, Agent, or Firm* — Canon U.S.A., Inc., IP Division

(57) ABSTRACT

Disclosed is an image forming apparatus that includes a process cartridge including a recording material; an image former that form a first image for a body and a second image for adhesion on a sheet by using a recording material; a sheet bonder that bond together a predetermined number of sheets on which at least one image has been formed; one or more memory devices that store a set of instructions; and one or more processors that execute the set of instructions to: set a density level of an image to be formed, and based on the set density level, individually control densities of the first image and the second image.

8 Claims, 18 Drawing Sheets

IMAGE FORMING APPARATUS, METHOD FOR CONTROLLING THE SAME, AND STORAGE MEDIUM

BACKGROUND

Field

The present disclosure relates to an image forming apparatus having a function for bonding sheets together, a method for controlling the same, and a storage medium.

Description of the Related Art

Japanese Patent Laid-Open No. 2004-209859 proposes a technique for using thermocompression to bond sheets coated with toner as an adhesive material to each other by applying heat and pressure. In addition, Japanese Patent Laid-Open No. 2013-43751 proposes a technique of switching between placing toner in toner regions to be heated and pressed on one side or both sides, in order to adjust an adhesive force. In addition, a mechanism for switching the strength of the adhesive force by switching the pattern in which the toner is placed has been proposed.

However, the above-described conventional techniques may present challenges, as described below. The user may set the toner (developing material) density to be high or low in order to obtain an expected product (printed matter). This toner density setting is applied to the entire image. However, in a sheet bonding apparatus using a thermocompression bonding method, toner is used as an adhesive material. Therefore, when the user sets the toner density of the product to be low, the toner density at the pressing position applied for adhesion also becomes low. In this case, an expected adhesive force may not be achieved.

SUMMARY

To overcome shortcomings of conventional systems, the present disclosure enables realization of a mechanism for controlling the density of an image formed from a recording material and advantageously bonding a bundle of sheets by using the recording material.

An aspect of the present disclosure provides an image forming apparatus that includes a process cartridge including a recording material; an image former configured to form a first image for a body and a second image for adhesion on a sheet by using a recording material; a sheet bonder configured to bond together a predetermined number of sheets on which at least one image has been formed; one or more memory devices that store a set of instructions; and one or more processors that execute the set of instructions to: set a density level of an image to be formed, and, based on the set density level, individually control densities of the first image and the second image.

Another aspect of the present disclosure provides a method of controlling an image forming apparatus that includes a process cartridge including a recording material; an image former configured to form a first image for a body and a second image for adhesion on a sheet by using a recording material; and a sheet bonder configured to bond together a predetermined number of sheets on which at least one image has been formed, the method including setting a density level of an image to be formed, and, based on the set density level, individually controlling densities of the first image and the second image.

Still another aspect of the present disclosure provides a non-transitory storage medium storing a program for causing a computer to execute a method of controlling an image forming apparatus that includes a process cartridge including a recording material; an image former configured to form a first image for a body and a second image for adhesion on a sheet by using a recording material; and a sheet bonder configured to bond together a number of sheets on which at least one image has been formed, with the method including setting a density level of an image to be formed, and, based on the set density level, individually controlling densities of the first image and the second image.

Further features of the present disclosure will become apparent from the following description of exemplary embodiments (with reference to the attached drawings).

DESCRIPTION OF THE EMBODIMENTS

Figure 1:
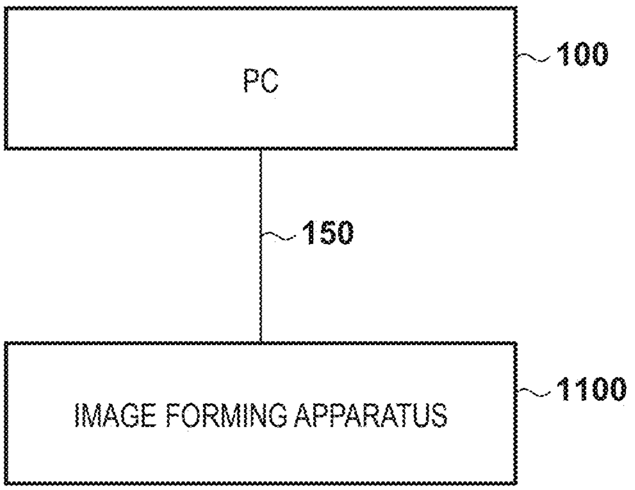
FIG. 1 is a view illustrating a configuration of a printing system according to an embodiment.

Hereinafter, embodiments will be described in detail with reference to the attached drawings. The following embodiments are not intended to limit the scope of the claims. Multiple features are described in the embodiments, without limitation to require all such features, and multiple such features may be combined as appropriate. Furthermore, in the attached drawings, the same reference numerals are given to the same or similar configurations, and redundant description thereof is not repeated, for conciseness.

In the present specification, the term image forming apparatus broadly includes an apparatus that forms (records) an image on a recording medium, such as a single function printer, a copying machine, a multifunction peripheral, and a commercial printing machine. Further, the image forming apparatus may be a system (image forming system) in which an image forming apparatus main body that forms an image on a recording medium and devices such as a sheet processing apparatus and a sheet feeding apparatus are connected to each other.

First Embodiment

<System Configuration>

A configuration example of a system according to the present embodiment is described with reference to FIG. 1. The image forming system is configured to include a personal computer (PC) 100 and an image forming apparatus 1100. These apparatuses are connected to so as to be able to communicate with each other via a communication line 150 such as a local area network (LAN) or a universal serial bus (USB).

The PC 100 may be a mobile terminal such as a personal digital assistant (PDA) or an electronic device such as a mobile telephone. In addition, although the system illustrated in FIG. 1 illustrates an example of a system configuration in which one PC 100 and one image forming apparatus 1100 are included, the present disclosure is not intended to be limited thereto, and a plurality of apparatuses may be included. The system may also include other apparatuses such as a server apparatus.

<Hardware Configuration>

(Configuration of PC)

Figure 2B:
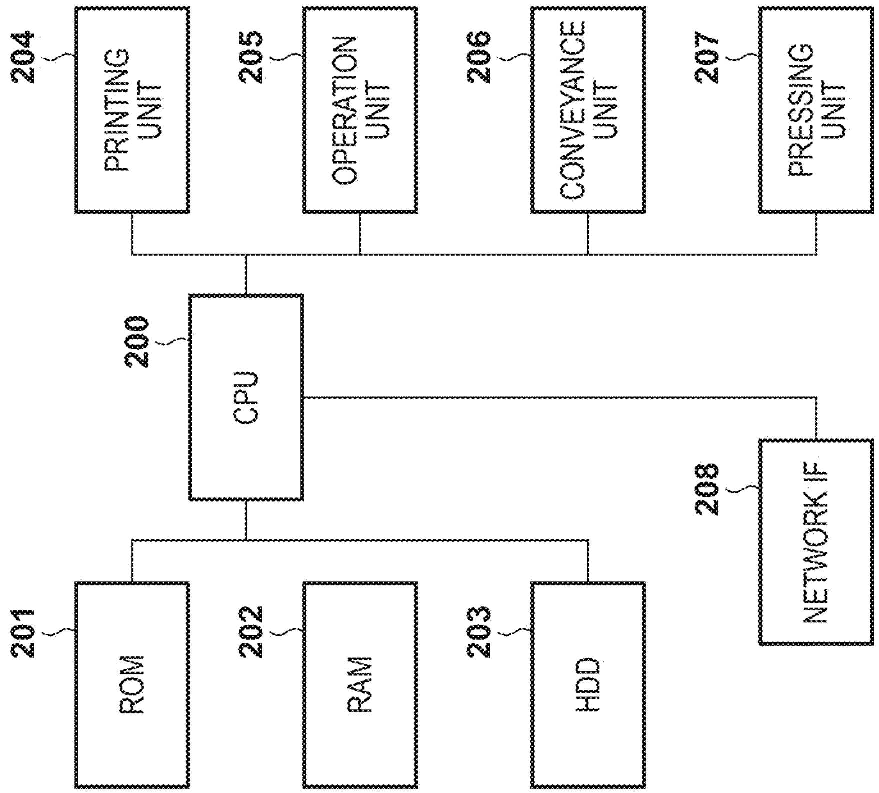
FIGS. 2A and 2B are block diagrams of an image forming apparatus and a printer driver according to an embodiment.
Figure 2A:
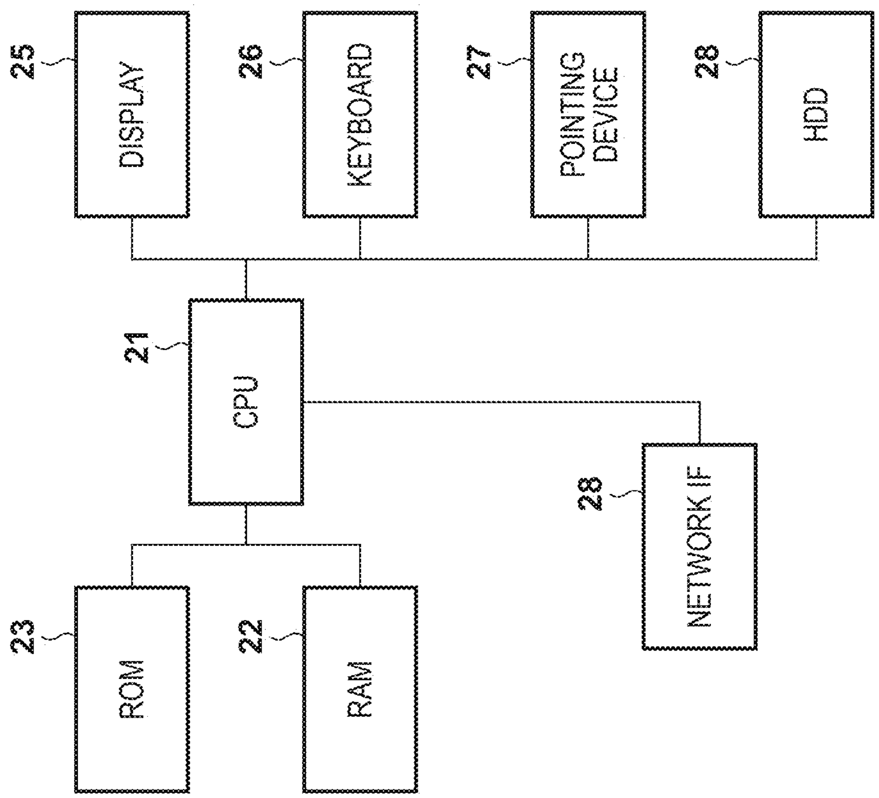

A hardware configuration of the present system is described referring to FIGS. 2A and 2B. FIG. 2A illustrates a main hardware configuration of the PC 100. The PC 100 includes a CPU 21, a RAM 22, a ROM 23, a network IF 24, a display 25, a keyboard 26, a mouse 27, and a hard disk drive (HDD) 28. The devices are connected via the CPU 21.

The CPU 21 controls the entire computer using programs and data stored in the RAM 22 or the ROM 23, and executes various processes described later. The RAM 22 is provided with an area for temporarily recording programs and data loaded from the HDD 28. The RAM 22 also includes a work area used by the CPU 21 to execute various processes, such as programs and data received from an external device via the network IF 24. The ROM 23 stores a boot program, setting data for the devices constituting the PC 100, and the like.

The network IF 24 functions as an interface unit for connecting the PC 100 to the communication line 150, and the PC 100 can perform data communication with an external device via the communication line 150 via the network IF 24. The type of the network IF 24 is not particularly limited, and any type may be used.

The display 25 is connected to a CRT, a liquid crystal display, or the like, and can display processing results of the CPU 21 (for example, a print setting screen to be described later) using images, texts, or the like. Each of the keyboard 26 and the mouse 27 is an exemplary input device, and functions as a user interface for inputting various instructions to the CPU 21. The type of the input device is not limited thereto.

The HDD 28 stores an operating system (OS), a document creation program, a printer driver, and table data to be described later. Any other storage device that can stored data, such as a solid state drive (SSD), may be used. The PC 100 reads the installed operation system and programs into the RAM 22, and, in the case of printing a document after creating the document, transmits print information to the image forming apparatus 1100 through the communication line 150 via the printer driver.

(Configuration of Image Forming Apparatus)

FIG. 2B illustrates a main hardware configuration of the image forming apparatus 1100. The image forming apparatus 1100 is configured to include a CPU 200, a RAM 202, an HDD 203, a printing unit 204, an operation unit 205, a conveyance unit 206, a pressing unit 207, and a network IF 208. The CPU 200 is a central processing unit and is connected to a ROM 201, the RAM 202, the HDD 203, and the bus. The CPU 200 executes various programs stored in the ROM 201 to perform an image forming operation. In addition, various types of control data used by the CPU 200 during an image-forming operation are stored in the RAM 202. The HDD 203 stores print data and the like.

When the CPU 200 receives a request to start an image forming operation via the operation unit 205 or the network IF 208, it controls the loads of the conveyance unit 206 to perform a sheet conveyance operation, and controls the loads of the printing unit 204 to perform a printing operation. In addition, the CPU 200 controls the loads of the pressing unit 207 depending on a setting to perform a sheet pressing operation.

<Detailed Configuration of Image Forming Apparatus>

Figure 3A:
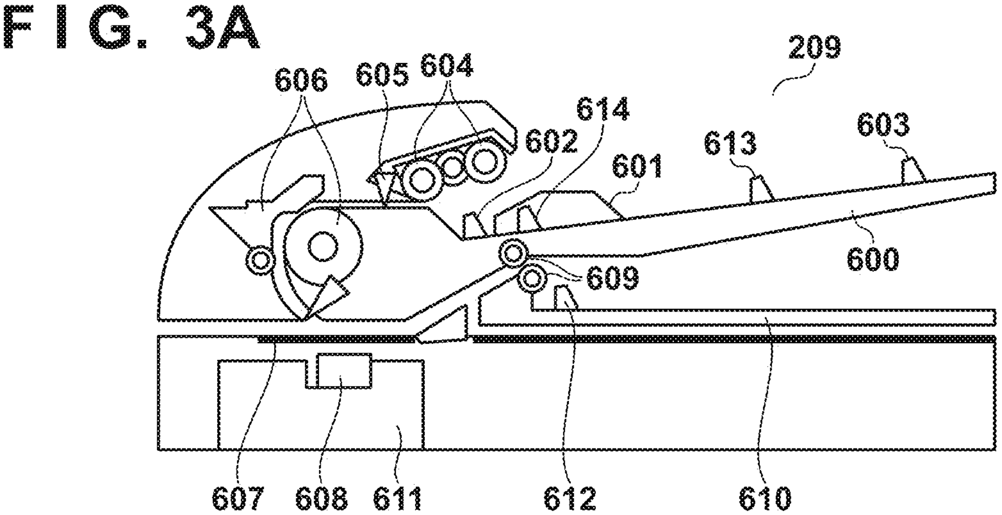
FIGS. 3A and 3B are views illustrating a side cross section of the image forming apparatus according to an embodiment.
Figure 3B:
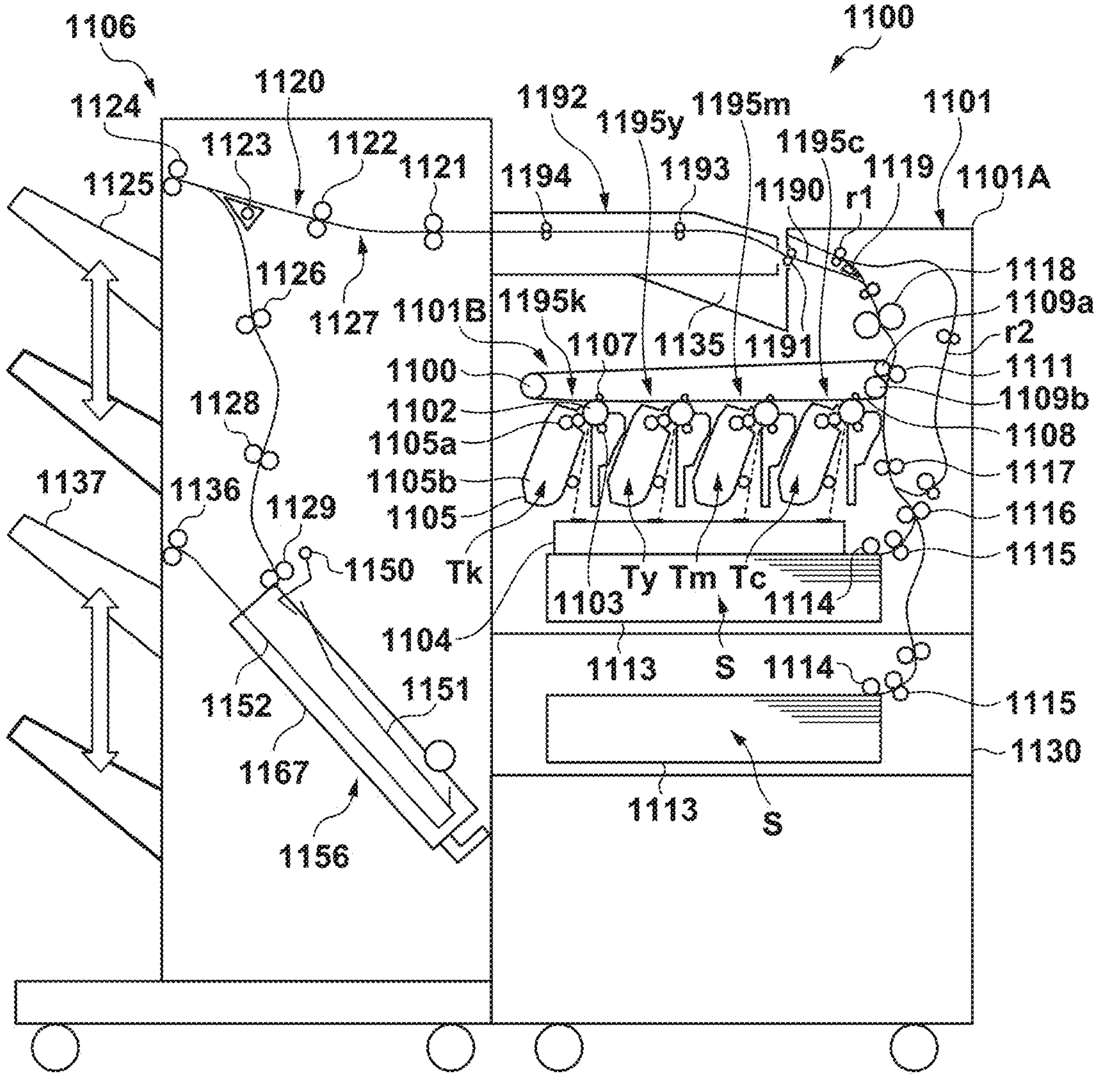

A detailed exemplary hardware configuration of the image forming apparatus 1100 according to the present embodiment is described referring to FIGS. 3A and 3B. FIG. 3A is a side sectional view illustrating an automatic document feeder of a reading unit 209 of the image forming apparatus 1100 according to a first embodiment. This automatic document feeder is also referred to as an automatic document feeder or an Auto Document Feeder (ADF).

The automatic document feeder includes a document tray 600 for stacking documents to be read. On the document tray 600, there are two document guides 601, and also a document sensor 602 for detecting the presence or absence of a document, and three document size detection sensors 603, 613, and 614 are arranged. The document guides 601 are movable in a direction perpendicular to the document conveyance direction, and can stabilize the document conveyance by the user moving the guides until they are in contact with both main scanning direction ends of the documents placed on the document tray 600. The two document guides 601 are provided lined up in the vertical direction of the documents (perpendicular to the document conveyance direction), and a document placed on the document tray 600 is conveyed by the rotation of three rollers: pickup rollers 604, conveyance rollers 606, and discharge rollers 609. The pickup rollers 604 are rollers for conveying a document stacked on the document tray 600 into a document conveyance path inside the automatic document feeder. The conveyance rollers 606 convey the document conveyed into the document conveyance path by the pickup rollers 604, and the discharge rollers 609 convey the document conveyed by the conveyance rollers 606 to a discharge tray 610.

The discharge tray 610 is provided with a discharge tray document sensor 612 for detecting the presence or absence of a document conveyed to the discharge tray 610. Further, a document that has been conveyed by the pickup rollers 604 is detected by a document passage detection sensor 605, and it is determined whether or not a first document has passed based on the detection time. The conveyance rollers 606, the pickup rollers 604, and the discharge rollers 609 are all driven by a stepping motor.

The document conveyed by the automatic document feeder is caused to pass through a reading window 607 of the automatic document feeder, and is read by a contact image sensor (CIS) 608 provided in a sensor unit 611 therebelow. The sensor unit 611 can freely move in the sub-scanning direction (conveyance direction of the document), and can move in the same direction as the conveyance direction of the document conveyed from the conveyance rollers 606 toward the discharge rollers 609. The reading window 607 has a certain length with respect to the sub-scanning direction, and within the scope of the length, the CIS 608 can be moved to any position and the document can be read at the moving position. The CIS 608 includes a photoelectric conversion element such as a CCD and a FIFO for storing image data obtained by the photoelectric conversion elements, and simultaneously generates control signals for controlling the FIFO and the CCD. The CIS 608 is generally realized by arranging a plurality of photoelectric transducers in a row.

FIG. 3B illustrates a side cross section of the image forming apparatus 1100. The image forming apparatus 1100 includes a printer main body 1101 as an image forming apparatus main body having an image forming function (printing function), and a sheet processing apparatus 1106 having a sheet bonding function. That is, the image forming apparatus 1100 may be an image forming system configured to include the printer main body 1101, which functions independently as an image forming apparatus, and the sheet processing apparatus 1106.

In the image forming apparatus 1100 of the present embodiment, by forming images one by one on sheets S in the printer main body 1101, and bonding a plurality of sheets S by thermocompression in the sheet processing apparatus 1106, it is possible to create a booklet for which printing and bookbinding are performed by a single apparatus. As the sheet S, various sheet materials having different sizes and materials can be used, such as paper (e.g., plain paper or cardboard), a sheet material subjected to surface treatment (e.g., coated paper), a plastic film, a cloth, and a sheet material having a special shape (e.g., envelope or index paper).

(Configuration of Image Forming Apparatus Main Body)

A configuration example of the image forming apparatus main body is described herein. The printer main body 1101 includes the printing unit 204 and the conveyance unit 206 of FIG. 1. The printer main body 1101 is an electrophotographic apparatus including a housing 1101A and an electrophotographic image former 1101B accommodated in the housing 1101A.

The image former 1101B includes an intermediate transfer belt 1108 serving as an intermediate transfer member, process cartridges disposed along the intermediate transfer belt 1108, a scanner unit 1104 serving as an exposure unit, and a primary transfer roller 1107. There are process cartridges for four colors, which are yellow 1195*y*, magenta 1195*m*, cyan 1195*c*, and black 1195*k*, each including toner which is a recording material in their respective color.

The process cartridge 1195*k* uses black toner Tk to form a single color image corresponding to a black component of a color image. The process cartridge 1195*y* uses yellow toner Ty to form a single color image corresponding to a yellow component of a color image. The process cartridge 1195*k* uses magenta toner Tm to form a single color image corresponding to a magenta component of a color image. The process cartridge 1195*c* uses cyan toner Tc to form a single color image corresponding to a cyan component of a color image. The image forming apparatus 1100 can realize the formation of monochrome images and color images using these process cartridges. The image forming apparatus 1100 according to the present embodiment has a first mode in which a monochrome image is formed using black toner Tk (a first recording material). Further, the image forming apparatus 1100 has a second mode in which a monochrome image is formed using yellow toner Ty, magenta toner Tm, or cyan toner Tc (another recording material). Further, the image forming apparatus has a third mode in which a color image is formed by using all the recording materials. In the present embodiment, a black and white image is given as an example of the monochrome image, but the monochrome image may be a blue single color image, or the like.

A process cartridge 1195 includes a photosensitive drum 1102 serving as an image carrier, a charging device 1103 serving as a charging unit, and a developing unit 1105 serving as a developing unit. Although only the process cartridge 1195*k* is described in FIG. 3B, the process cartridge 1195*y*, the process cartridge 1195*m*, and the process cartridge 1195*c* have similar configurations. The single color images formed in each of the process cartridges 1195*y*, 1195*m*, 1195*c*, and 1195*k* are primary-transferred to overlap each other on the intermediate transfer belt 1108, and then secondary-transferred to the sheet at a secondary transfer portion.

The developing unit 1105 includes a developing roller 1105*a* serving as a developing unit and a toner container 1105*b* containing toner (recording material). The developing roller 1105*a* is rotatably held by the toner container 1105*b*. Although only the developing unit 1105 in the process cartridge 1195*k* is described in FIG. 3B, the process cartridge 1195*y*, the process cartridge 1195*m*, and the process cartridge 1195*c* have similar configurations.

The process cartridges 1195*y*, 1195*m*, 1195*c*, and 1195*k* are attachable to and detachable from the housing 1101A. The "housing 1101A" of the printer main body 1101 refers to a part obtained by removing the process cartridge 1195 from the printer main body 1101. The housing 1101A includes a frame member such as a metal frame constituting a frame body of the printer main body 1101 and a member fixed to the frame body, and forms a mounting space in which the process cartridge 1195 is mounted.

The printer main body 1101 can use at least one of the plurality of colors of toner as toner for bonding sheets to each other. For example, the black toner Tk can be used as a toner for recording images on a sheet and also as a toner for bonding. In such cases, the process cartridge 1195*k* generates a single color image (monochrome) corresponding to the black component of the color image and an adhesive toner image 39 (FIG. 6) for transfer to an adhesion region of the sheet. Here, the toner for bonding is a toner having an adhesive component and having a higher adhesion capability than that of a normal toner.

The scanner unit 1104, which is an exposure unit, is disposed below the process cartridge 1195 in the housing 1101A. Below the scanner unit 1104, a cassette 1113 (also referred to as a sheet tray or storage compartment) serving as a storage unit for storing a sheet S used for image formation is attached to the housing 1101A such that it can be pulled out. Further, one or more optional sheet feeding apparatuses 1130 including additional cassettes 1113 may be coupled below the housing 1101A.

The intermediate transfer belt 1108 is an endless belt that can move (can rotate) and that is stretched around a drive roller 1109*a*, a stretching roller 1109*b*, and a tension roller 1110, which rotate about axes that are parallel to each other. The intermediate transfer belt 1108 is moved (rotated, conveyed) counterclockwise in the drawing by the rotation of the drive roller 1109*a*. On the inner peripheral side of the intermediate transfer belt 1108, the primary transfer roller 1107 serving as a primary transfer member is disposed at a position facing the photosensitive drum 1102 via the intermediate transfer belt 1108. A secondary transfer roller 1111 serving as a transfer member (secondary transfer member) is disposed at a position on the outer peripheral side of the intermediate transfer belt 1108 and opposed to the drive roller 1109*a* via the intermediate transfer belt 1108. A secondary transfer portion as a transfer portion is formed as a nip portion between the intermediate transfer belt 1108 and the secondary transfer roller 1111. The intermediate transfer belt 1108, the primary transfer roller 1107, and the secondary transfer roller 1111 constitute a transfer unit for transferring a toner image formed on the photosensitive drum 1102, which is an image carrier, to the sheet S.

A fixing device 1118 is disposed above the secondary transfer portion in the housing 1101A. The fixing device 1118 has a configuration of a thermal fixing method in which the toner image is fixed by heating. The fixing device 1118 includes a pair of rotating bodies (for example, a pair of rollers including a fixing roller and a pressure roller) that sandwich and convey the sheet S, and a heat source (for example, a halogen lamp or an induction heating mechanism) that heats the toner image on the sheet S via the fixing roller.

When the printer main body 1101 performs an image forming operation, the sheet S is fed from the cassette 1113 at the lower portion of the housing 1101A or the cassette 1113 of the sheet feeding apparatus 1130 by the feed roller 1114. A pair of separation rollers 1115 conveys the fed sheets S while separating them one by one. The sheet S is conveyed toward a pair of registration rollers 1117 by a drawing roller 1116, and a skew of the sheet S is corrected by the leading edge of the sheet S abutting against a nip portion of the pair of registration rollers 1117 which are in a stopped state. The pair of registration rollers 1117 feeds the sheet S to the secondary transfer unit at a timing synchronized with the progress of the toner image forming process by the image former 1101B.

On the other hand, in the image former 1101B, the photosensitive drum 1102 and the intermediate transfer belt 1108 rotate. The charging device 1103 uniformly charges the surface of the photosensitive drum 1102. The scanner unit 1104 writes an electrostatic latent image by irradiating the photosensitive drum 1102 with a laser beam based on image information representing an image to be recorded on the sheet S. The electrostatic latent image is developed (visualized) as a toner image by development by the developing unit 1105 using the toner.

Here, when the sheet processing apparatus 1106 performs thermocompression bonding to be described later, the scanner unit 1104 irradiates the photosensitive drum 1102 with a laser beam to write an electrostatic latent image on the basis of information indicating the bonding position of the sheet S. The electrostatic latent image is developed by the developing unit 1105 in the process cartridge 1195*k* using toner, so that an adhesive toner image is formed in a region on the photosensitive drum 1102 corresponding to the adhesive position on the sheet S.

The single color images formed in the photosensitive drum 1102 of each of the process cartridges 1195*y*, 1195*m*, 1195*c*, and 1195*k* are primary-transferred to overlap each other on the intermediate transfer belt 1108. Thereafter, the intermediate transfer belt 1108 is conveyed toward the secondary transfer portion by rotation. When a voltage is applied to the secondary transfer roller 1111 in the secondary transfer unit, the toner image is transferred (secondarily transferred) to the sheet S fed from the pair of registration rollers 1117. The sheet S, after passing through the secondary transfer unit, is sent to the fixing device 1118, and the toner image is heated and pressed while passing through the nip portion of the fixing roller and the pressure roller to soften the toner, and then bond it, whereby the image is affixed to the sheet S. The fixing temperature here is, for example, 180° C.

The conveyance path of the sheet S, after it has passed through the fixing device 1118, is switched by a switching unit 1119. In single-sided printing, the sheet S is guided to a discharge path 1190 by the switching unit 1119, and is discharged from the housing 1101A by a pair of discharge rollers 1191. In the present embodiment, the printer main body 1101 is connected to the sheet processing apparatus 1106 via a relay conveyance unit 1192. The sheet S, after being discharged from the pair of discharge rollers 1191, is transferred to the sheet processing apparatus 1106 via the pair of conveyance rollers 1193 and 1194 of the relay conveyance unit 1192. When the relay conveyance unit 1192 and the sheet processing apparatus 1106 are not connected to each other, the pair of discharge rollers 1191 discharges the sheet S as a product to a stacking tray 1135 provided in the upper portion of the housing 1101A.

In double-sided printing, the sheet S, after an image is formed on the first surface thereof, is guided to a pair of reversing rollers r1 by the switching unit 1119. Then, the sheet S is inversely conveyed (switchback conveyance) by the pair of reversing rollers r1, and then conveyed toward the pair of registration rollers 1117 via a double-sided conveyance path r2. Then, the sheet S is discharged from the housing 1101A by the pair of discharge rollers 1191 after an image is formed on the second surface on the opposite side of the first surface, by passing through the secondary transfer unit and the fixing device 1118.

Figure 6:
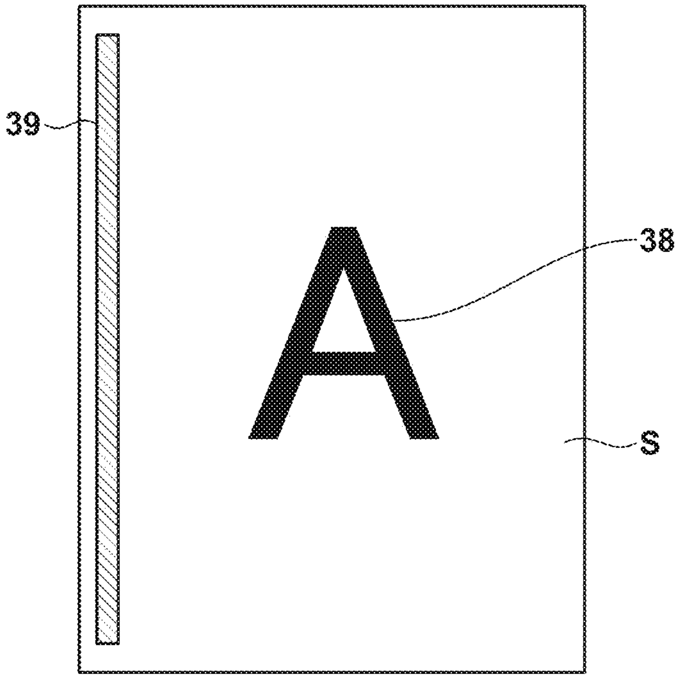
FIG. 6 is a view illustrating a toner image formed on a sheet by the image forming apparatus according to the embodiment.

Here, an example of a toner image (recording material image) formed on the sheet S is described with reference to FIG. 6. In a print image, a toner image (first image) 38 for recording an image (object) such as text, a figure, or a photograph and an adhesive toner image (second image) 39 for bonding sheets to each other are formed in the illustrated sheet S. Here, the position, shape, width, and the like of the adhesive toner image 39 can be changed in accordance with the configuration of a thermocompression bonding unit 1167 described later.

When the image forming apparatus 1100 creates a single-sided printed booklet, the adhesive toner image 39 is formed on only one side of the sheet S (the same surface as the toner image for recording). In the case of a double-sided printed booklet, configuration may be such that the adhesive toner image 39 is formed on only one side of the sheet S, or is formed on both sides of the sheet S. Here, although an example in which the adhesive toner image 39 is formed on the long side (a predetermined position) on the left side in the drawing has been described, the adhesive toner image 39 may be formed on the long side on the right side, the short side on the upper side, or the short side on the lower side depending on the capability of the apparatus.

(Sheet Processing Apparatus)

The configuration of the sheet processing apparatus 1106 is described herein. The sheet processing apparatus 1106 includes a buffer unit 1120 which is a buffer for stacking a plurality of sheets S, an alignment unit 1156 for aligning the plurality of sheets S, and the thermocompression bonding unit 1167 for bonding the sheets S to each other by thermocompression. The thermocompression bonding unit 1167 corresponds to the pressing unit 207 of FIG. 1, and is an example of a sheet bonding apparatus (bonding unit, thermocompression bonding unit, bonding processing unit) for bonding the sheets to each other. Further, the sheet processing apparatus 1106 includes an upper discharge tray 1125 and a lower discharge tray 1137 that can be raised and lowered, respectively, as discharge destinations for discharging products of the image forming apparatus 1100.

The sheet processing apparatus 1106 is a sheet processing apparatus that receives a plurality of sheets S on which images are formed one by one by the printer main body 1101, performs an adhesion process (thermocompression bonding), and discharges the sheets as a sheet bundle (booklet). Details of the buffer unit 1120, the alignment unit 1156, and the thermocompression bonding unit 1167 are described herein. The sheet processing apparatus 1106 can also discharge the sheet S after an image has been formed thereon by the printer main body 1101 to the upper discharge tray 1125 or the lower discharge tray 1137 without performing processing.

<Buffer Unit Configuration>

Figure 4:
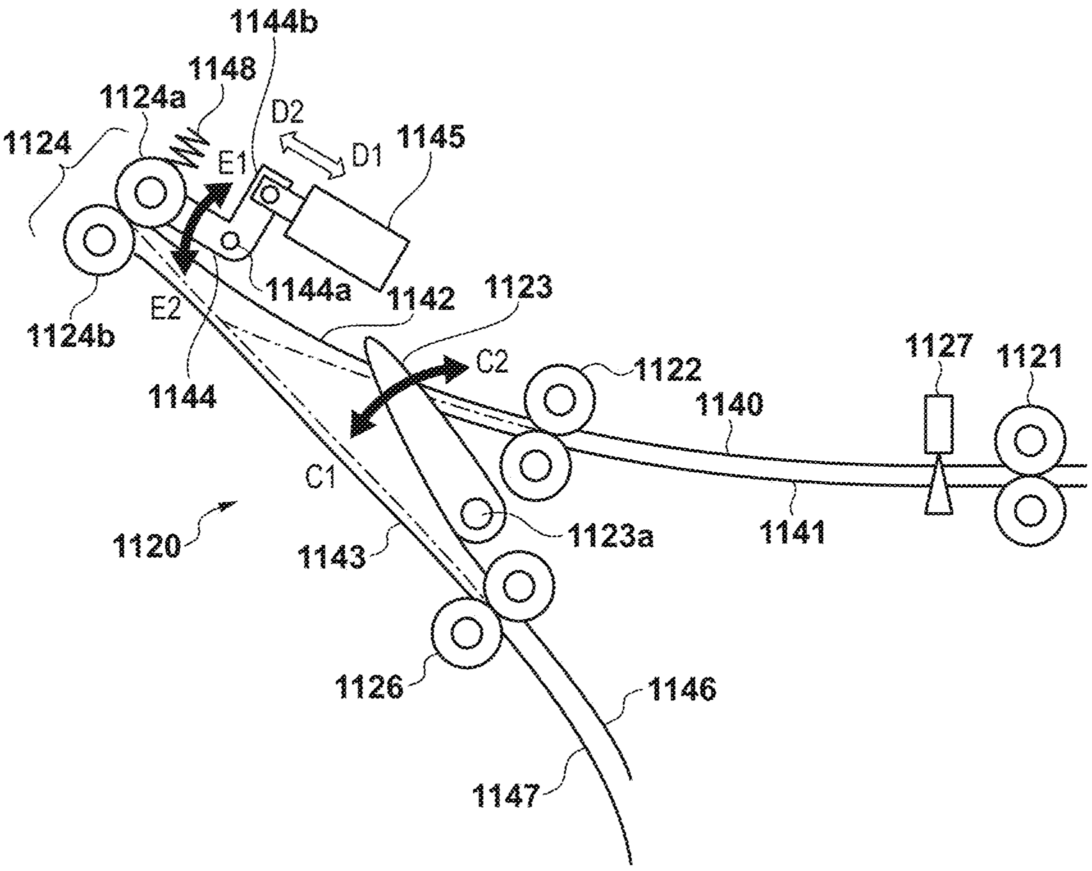
FIG. 4 is a view illustrating a buffer unit of the sheet processing apparatus according to the embodiment.

Referring to FIGS. 3A and 3B and FIG. 4, a configuration of the buffer unit 1120 is described. FIG. 4 is an enlarged cross-sectional view of the buffer unit 1120. The buffer unit 1120 includes a pair of entrance rollers 1121, a pair of pre-buffer rollers 1122, a backflow prevention valve 1123, a pair of reversing rollers 1124, and a pair of inner discharge rollers 1126. In addition, the buffer unit 1120 includes a separation mechanism including an entrance sensor 1127 for detecting a sheet and a plunger solenoid 1145 and the like for opening and closing (bringing into contact and separating) the pair of reversing rollers 1124.

Each of the pair of entrance rollers 1121, the pair of pre-buffer rollers 1122, the pair of reversing rollers 1124, and the pair of inner discharge rollers 1126 is a pair of rollers that sandwiches and conveys sheets. The pair of entrance rollers 1121 and the pair of pre-buffer rollers 1122 are arranged in a conveyance path (entrance path) for the sheet processing apparatus 1106 to receive the sheet S. The pair of reversing rollers 1124 is disposed in a conveyance path (first discharge path, refer to FIG. 3) communicating with the upper discharge tray 1125. The pair of inner discharge rollers 1126 is disposed in a conveyance path (inner discharge path, refer to FIG. 3) from the pair of reversing rollers 1124 toward the thermocompression bonding unit 1167. The sheet processing apparatus 1106 includes a conveyance path (second discharge path, refer to FIG. 3) from the thermocompression bonding unit 1167 toward the lower discharge tray 1137.

The entrance path is formed by an upper entrance guide 1140 and a lower entrance guide 1141 of FIG. 4. A first discharge path is formed by an upper inverting guide 1142 and a lower inverting guide 1143. An inner discharge path is formed by an upper inner discharge guide 1146 and a lower inner discharge guide 1147. The entrance sensor 1127 is arranged to detect a sheet received by the pair of entrance rollers 1121. The entrance sensor 1127 may use, for example, a reflective photosensor that irradiates infrared light toward an entrance path through an opening provided in the upper entrance guide 1140 and detects light reflected from a sheet to determine the presence or absence of the sheet S. The lower entrance guide 1141 may be provided with a hole having a spot diameter or more of the infrared light emitted from the entrance sensor 1127 so as not to reflect infrared light when no sheet is passing through the entrance path.

The backflow prevention valve 1123 is disposed downstream of the pair of pre-buffer rollers 1122 in the sheet conveyance direction in the entrance path. The backflow prevention valve 1123 is rotatably disposed about the rotational shaft 1123*a* with respect to the upper inner discharge guide 1146. The backflow prevention valve 1123 can move between a first position for preventing the sheet from moving (backflow) from the first discharge path to the entrance path and a second position for allowing the sheet to move from the entrance path to the first discharge path. The backflow prevention valve 1123 is biased in a C2 direction from the second position toward the first position by a spring. The backflow prevention valve 1123 is configured to be pressed by the sheet to move in the C1 direction from the first position toward the second position, and return to the first position when the sheet passes.

When viewed in the direction of the rotation axis of the backflow prevention valve 1123, the distal end portion of the backflow prevention valve 1123 in the first position overlaps with the upper inverting guide 1142. In addition, the distal end portion of the backflow prevention valve 1123 is formed in a comb-like shape so as to enable overlap with the upper inverting guide 1142. Further, when viewed in the direction of the rotation axis of the backflow prevention valve 1123, a space through which the sheet can pass is formed between the backflow prevention valve 1123 at the second position and the upper inverting guide 1142.

The pair of reversing rollers 1124 includes an upper reversing roller 1124*a* and a lower reversing roller 1124*b*, and drive is supplied to both rollers. The rotations of the upper reversing roller 1124*a* and the lower reversing roller 1124*b* are configured to be constantly synchronized. Further, a separation lever 1144 is connected to the upper reversing roller 1124*a*. The separation lever 1144 is rotatably supported about a lever fulcrum shaft 1144*a* with respect to the upper inverting guide 1142. The separation lever 1144 is rotatably connected to the plunger solenoid 1145 in a solenoid connection shaft 1144*b*.

When a current flows through the plunger solenoid 1145, the core moves in a D1 direction in the drawing, so that the separation lever 1144 rotates in an E1 direction in the drawing. In such a case, the pair of reversing rollers 1124 is in a separated state (a state in which the nip portion is opened) in which the upper reversing roller 1124*a* and the lower reversing roller 1124*b* are separated from each other. In a case where the current flowing through the plunger solenoid 1145 is stopped, the upper reversing roller 1124*a* moves in an E2 direction due to the biasing force of a pressurizing spring 1148, and the core of the plunger solenoid 1145 moves in a D2 direction. In such a case, the pair of reversing rollers 1124 is in a contact state (a state in which the nip portion is formed) in which the upper reversing roller 1124*a* and the lower reversing roller 1124*b* are in contact with each other.

As described below, the buffer unit 1120 performs an operation of stacking the newly conveyed sheet on the sheets (bundle) while reciprocating the sheets (bundle) between the pair of reversing rollers 1124 and the pair of inner discharge rollers 1126. By this operation, the buffer unit 1120 can send a predetermined number of sheets at a time (for example, five sheets) to the alignment unit 1156 in a stacked state.

As illustrated in FIG. 3, a sheet bundle stacked in the buffer unit 1120 is conveyed from the pair of inner discharge rollers 1126 to a pair of kick-out rollers 1129 via a pair of intermediate conveyance rollers 1128. Then, the sheet bundle is conveyed by the pair of kick-out rollers 1129 to the alignment unit 1156 (intermediate stacking portion, processing stage) including an upper intermediate guide 1151 and a lower intermediate guide 1152, and the like. Further, downstream of the pair of kick-out rollers 1129, a bundle pressing flag 1150 for suppressing the lifting of the trailing edge of the stacked sheets is arranged so that the trailing edge of the sheets already stacked on the alignment unit 1156 and the leading edge of the subsequent sheet conveyed to the alignment unit 1156 do not interfere with each other.

<Thermocompression Bonding Operation>

A thermocompression bonding operation performed by the thermocompression bonding unit 1167 according to the present embodiment is described referring to FIGS. 5A to 5F. FIGS. 5A to 5F view of the thermocompression bonding unit 1167 in the sheet conveyance direction (Y direction).

Figure 5A:
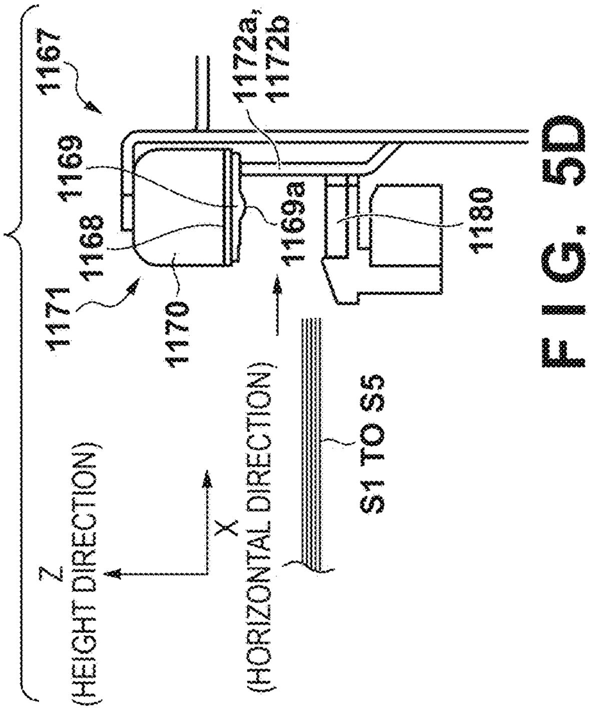
FIG. 5A to FIG. 5F are views illustrating an operation of a thermocompression bonding unit according to an embodiment.
Figure 5B:
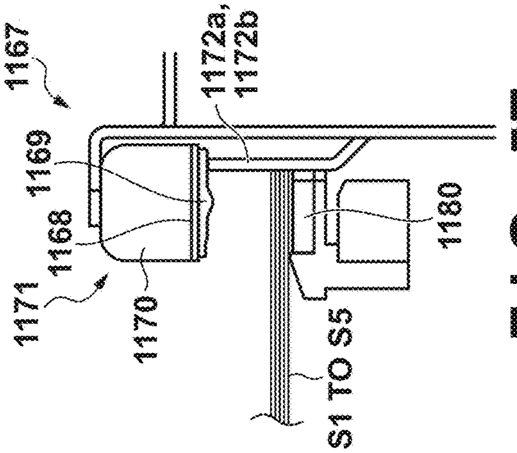

FIG. 5A is a view illustrating a condition in which alignment of the sheets S1 to S5 in the sheet conveyance direction (Y direction) is completed. In this state, a heater unit 1171 is at a position separated from the sheet bundle in a Z direction. FIG. 5B is a view illustrating a condition in which alignment of the sheets S1 to S5 in the widthwise direction is completed. The sheets S1 to S5 are aligned in the sheet width direction (X direction) by abutting against the width alignment reference plates 1172*a* and 1172*b*.

Figure 5C:
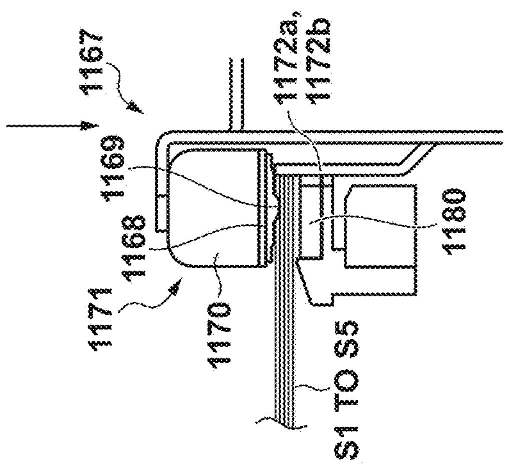
Figure 5D:
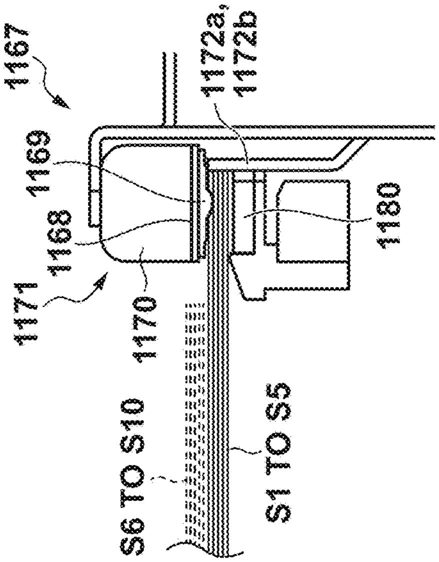

FIG. 5C illustrates a state in which the heater unit 1171 is moved in the pressurizing direction (−Z side) by the forward rotation of a motor, and a contacting surface 1169*a* of a pressurizing plate 1169 is brought into contact with the uppermost sheet S5. FIG. 5D illustrates a state in which, by the driving of the motor being continued, the sheets S1 to S5 are sandwiched between the pressurizing plate 1169 and a receiving plate 1180, and thermocompression bonding of the sheets S1 to S5 is ongoing. Further, FIG. 5D illustrates a state in which, in parallel to the thermocompression bonding of the sheets S1 to S5, subsequent sheets S6 to S10 have been conveyed to the alignment unit 1156.

Figure 5E:
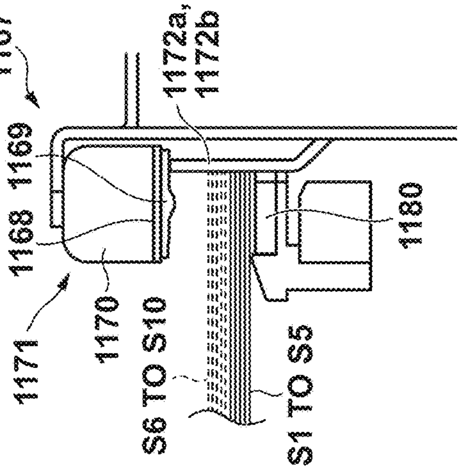

FIG. 5E illustrates a state in which, after the thermocompression bonding of the sheets S1 to S5 is completed, the heater unit 1171 is moved (retracted) to the opposite side (+Z side) in the pressurizing direction by the reverse rotation of the motor, and the pressurizing plate 1169 is separated from the sheet S5. Further, FIG. 5E illustrates a state in which alignment of the subsequent sheets S6 to S10 is performed, and the sheets S6 to S10 are brought into contact with the width alignment reference plates 1172*a* and 1172*b* after the heater unit 1171 is retracted.

Figure 5F:
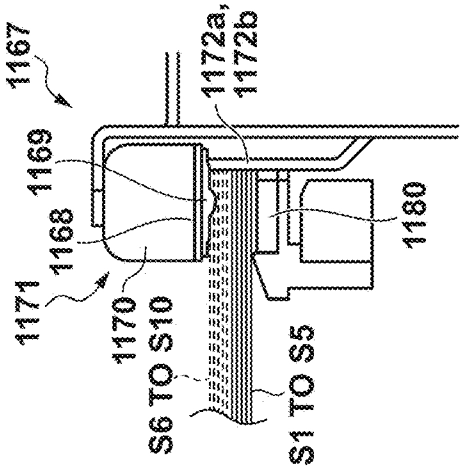

FIG. 5F illustrates a state in which the heater unit 1171 moves again in the pressurizing direction (−Z side) by the forward rotation of the motor, the sheets S1 to S10 are sandwiched between the pressurizing plate 1169 and the receiving plate 1180, and thermocompression bonding of the sheets S6 to S10 is ongoing. Here, since the toner image for bonding is formed on the upper surface of the sheet S5 and/or the lower surface of the sheet S6, the sheet bundle made of the sheets S1 to S5 and the sheet bundle made of the sheets S6 to S10 are thermocompression bonded.

As described above, the thermocompression bonding unit 1167 performs one thermocompression bonding operation each time a predetermined number of sheet bundles are aligned by the alignment unit 1156, so that a booklet including more than a predetermined number of sheets can be created. Although an example in which a booklet comprising ten sheets S1 to S10 is prepared has been described here, the present disclosure is not limited thereto, and a booklet made of several tens of sheets or more may be prepared.

When thermocompression bonding on all the sheets constituting parts of the booklet is completed, the booklet comprising the sheets S1 to S10 is pushed out by the vertical alignment reference plate, and the booklet is conveyed in a direction toward a pair of bundle discharge rollers 1136 (FIG. 3B) in the sheet conveyance direction (−Y side). In other words, the vertical alignment reference plate is an example of a pushing member that pushes out the sheet bundle from the alignment unit 1156 and the thermocompression bonding unit 1167. In addition, a pushing member for pushing out the processed sheet bundle may be provided separately from the vertical alignment reference plate as a reference for aligning the sheet bundle.

The pair of bundle discharge rollers 1136 is a pair of rollers that can be opened and closed (can come into contact and separate), and receives the booklet in a separated state. After the leading end of the booklet in the direction in which the vertical alignment reference plate pushes out the booklet exceeds the position of the pair of bundle discharge rollers 1136, the movement of the vertical alignment reference plate is stopped, and the pair of bundle discharge rollers 1136 is switched to the contact state. As a result, the pair of bundle discharge rollers 1136 sandwiches and conveys the booklet, and discharges the booklet to the lower discharge tray 1137. Meanwhile, the vertical alignment reference plate returns to the standby position again after transferring the booklet to the pair of bundle discharge rollers 1136. As described above, according to the configuration of the present embodiment, it is possible to provide a sheet bonding apparatus, a sheet processing apparatus, and an image forming apparatus capable of more stably bonding sheets to each other.

<Setting Screens>

Figure 7A:
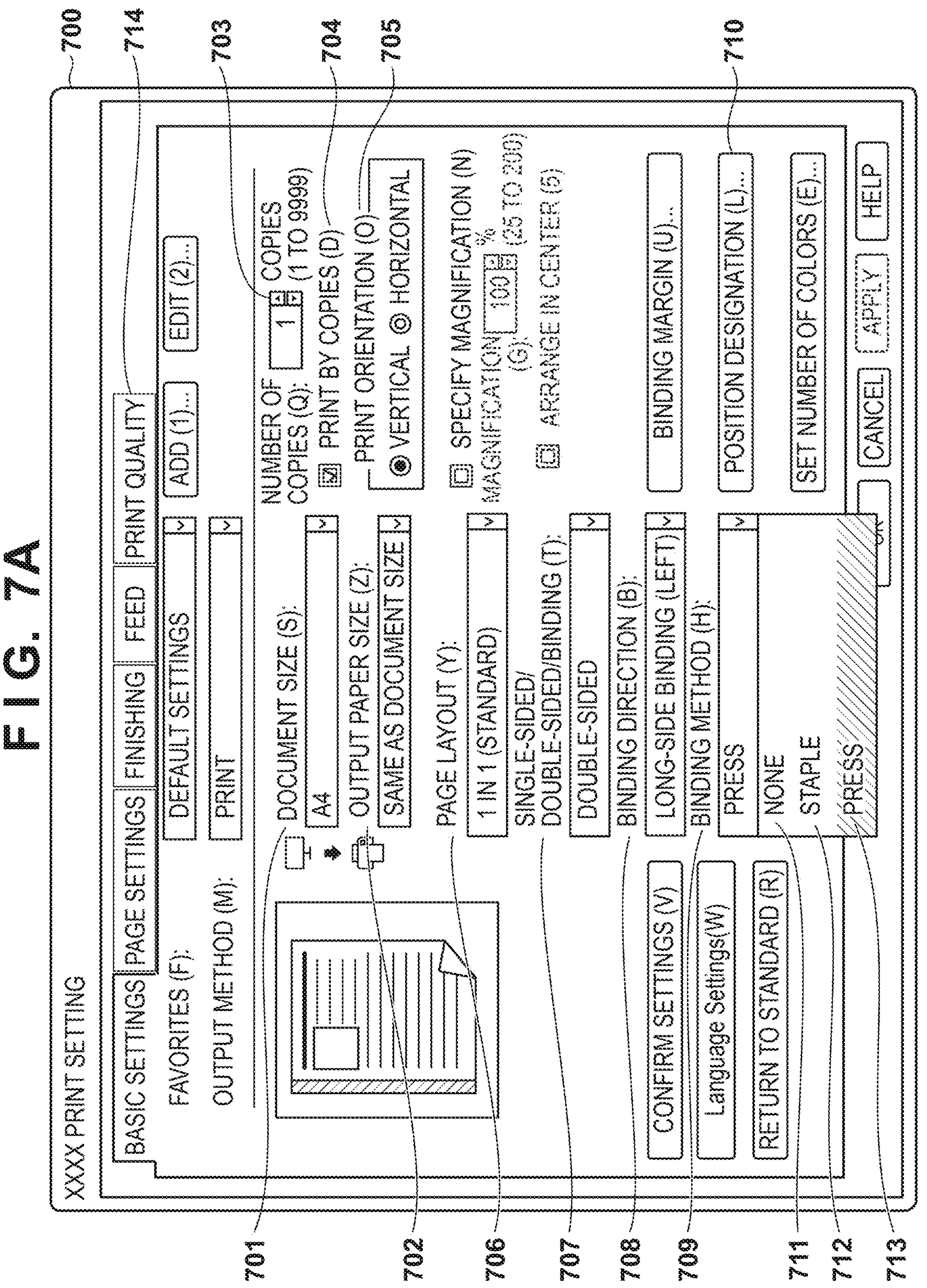
FIG. 7A and FIG. 7B are views illustrating screens of a printer driver according to an embodiment.

An example of setting screens of a printer driver according to the present embodiment is described with reference to FIGS. 7A and 7B. FIG. 7A illustrates an example of a print setting screen 700 displayed on the display 25 by a printer driver of the PC 100 according to the present embodiment.

The printer driver is a print control program installed in the PC 100, and is executed by the CPU 21. The printer driver is also called from a document program installed on the PC 100 to generate print information comprising a print setting command for performing printing and a drawing data command for printing. Print information generated by the CPU 21 using the printer driver is similarly transmitted by the CPU 21 to the image forming apparatus 1100 connected via the communication line 150 using the OS, and then print processing and sheet processing are performed. The print setting screen 700 is displayed on a display device such as the display 25 based on an instruction from the CPU 21, and a user performs print settings using an input device such as a pointing device or a keyboard via the screen.

The print setting screen 700 provides basic print settings such as a document size 701, a paper size 702, a number of copies 703, print by copies 704, and a print orientation 705. Further, as an extended printing function, it is possible to set a page layout 706 for setting layout printing and the like, single-sided/double-sided/binding 707 for setting single-sided, double-sided, bookbinding printing and the like, a binding direction 708 for setting a binding direction of a print product, and the like. Further, the print setting screen 700 has control of a binding method 709 for setting a binding method for a printed matter. The print setting screen 700 of FIG. 7A illustrates a screen at the time of setting of the binding method 709, and in addition to "none" 711 in which binding processing is not performed and "staple" 712 in which stapling is performed, "press" 713 for performing thermocompression bonding can be set. Further, a print quality tab 714 for displaying a control group for setting print quality is provided.

Figure 7B:
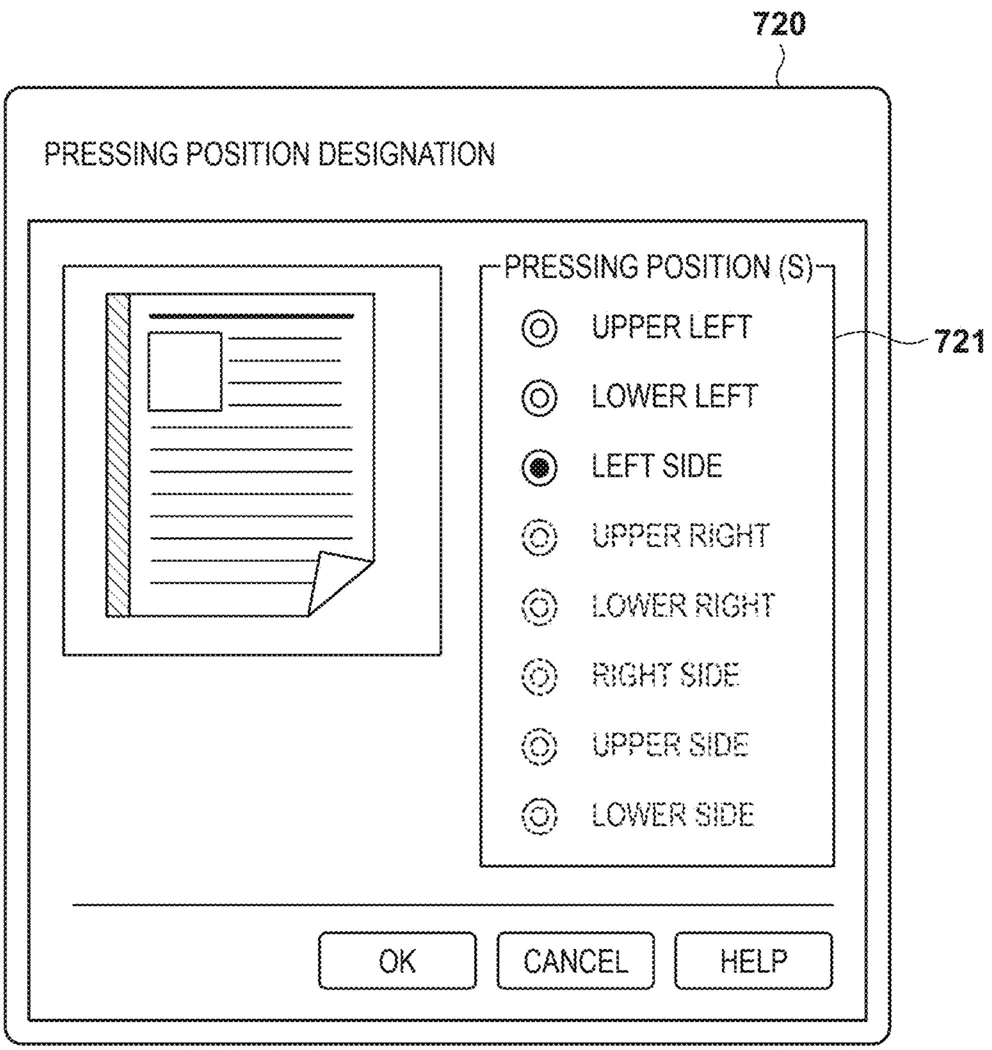

FIG. 7B illustrates an example of a position designation screen 720 displayed on the display 25 based on an instruction by the CPU 21 when a position designation 710 button of FIG. 7A is operated. On the screen, it is possible to designate a position at which the binding method set by the binding method 709 is to be applied.

When pressing 713 is set in the binding method 709, a pressing position designation screen 720 as illustrated in FIG. 7B is displayed. The user can set a pressing position 721 via the pressing position designation screen 720. Here, radio buttons for the pressing positions that can be set are displayed in an enabled state, and radio buttons for the pressing positions that cannot be set are displayed in a disabled state. The user input allows the desired pressing position to be designated from among the radio buttons in the pressing position in the enabled state. In the example of FIG. 7B, although a state in which "left side" is selected when the three positions of upper left, lower left, and left side are enabled and can be set by the user input is illustrated as an example, other positions may be selected by the user input. A position that cannot be selected according to the capability of the image forming apparatus may be controlled to be non-displayed and non-selectable.

When pressing 713 is set in the binding method 709, the CPU 21 uses the printer driver to write a command to perform thermocompression bonding at the position selected in the pressing position 721 of FIG. 7B in the print information. As a result, the pressing unit 207 of the image forming apparatus 1100, which has received the print information, performs pressing processing at the pressing position.

<Configuration of Operation Unit>

Figure 8A:
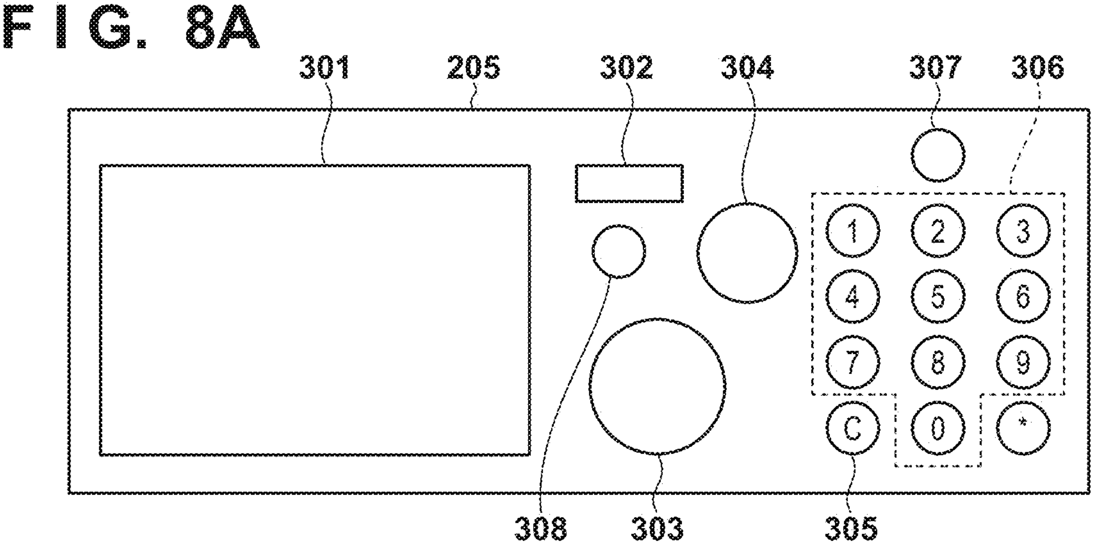
FIG. 8A to FIG. 8C are views illustrating an operation unit according to an embodiment.
Figure 8B:
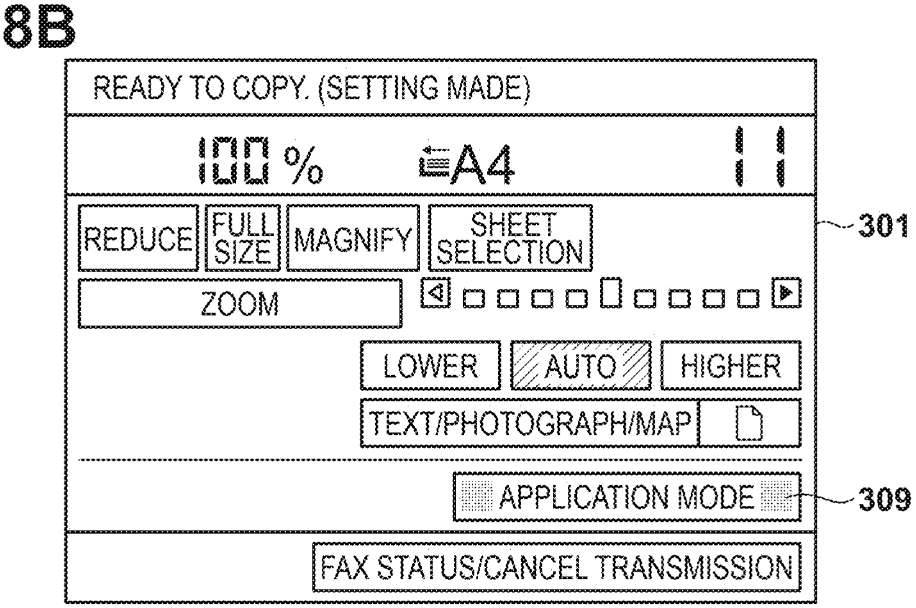
Figure 8C:
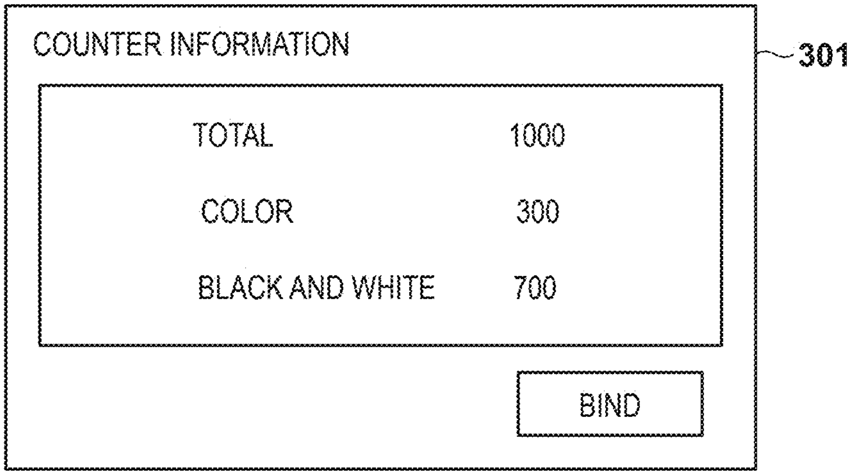

The operation unit 205 of the image forming apparatus 1100 is described referring to FIGS. 8A to 8C. The user can input and set various conditions and information to the image forming apparatus 1100 via the operation unit 205. FIG. 8A is a top view of the operation unit 205. A display unit 301 is a touch panel display, and can display, for example, a menu screen for copying as illustrated in FIG. 8B. In this menu screen, the number of copies, the selected paper size, and the magnification are displayed. When an application mode 309 of this screen is operated, a screen in which various settings of the copy job can be made is transitioned to.

In FIG. 8A, a reset key 302 is used to return the copy mode to a standard mode. A start key 303 instructs the start of the copy operation. A stop key 304 is used to interrupt the copy operation. A clear key 305 returns the copy mode to the standard mode. A numeric keypad 306 is numeric value input keys for setting the number of copies and the like. When a user mode key 307 is operated, a menu can be selected, and various settings for the image forming apparatus 1100 can be registered. When a counter key 308 is operated, the display of the display unit 301 becomes a screen such as FIG. 8C, and various counter information can be viewed. In FIG. 8C, the total number of color prints, the total number of monochrome prints, and the sum total thereof are displayed. The display unit 301 is also used to notify the user of information such as paper jam information and toner information.

<Print Quality Setting Screen>

Figure 9:
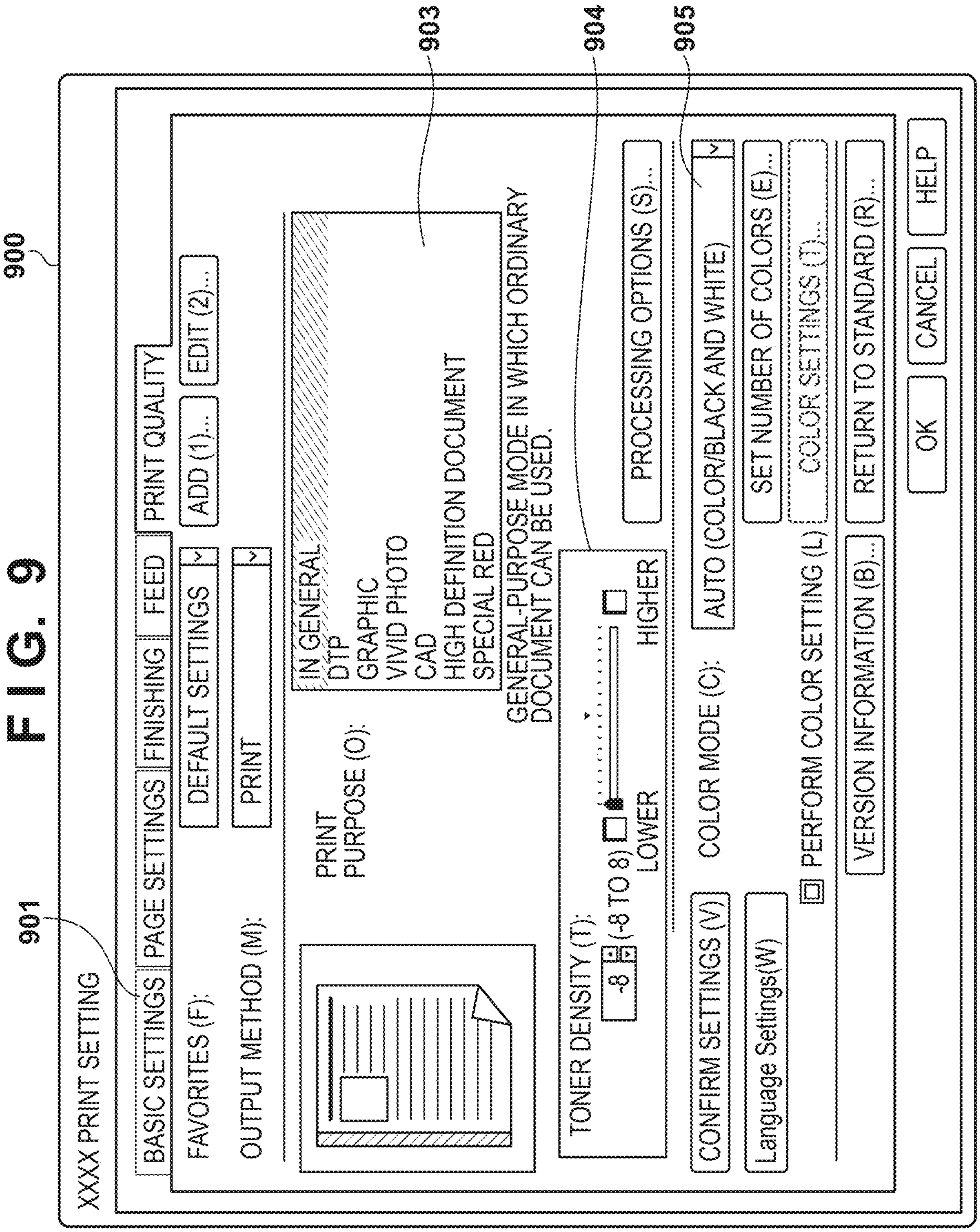
FIG. 9 is a view illustrating printer driver toner density designations according to an embodiment.

Referring to FIG. 9, a print quality setting screen for when the print quality tab 714 of the printer driver of FIGS. 7A to 7B is selected is described. A print quality setting screen 900 is displayed on a display device such as a display based on an instruction from the CPU, and the user performs print settings using an input device such as a mouse or a keyboard via the screen. The print quality setting screen 900 is configured to include a color mode setting 902, a print purpose setting 903 that calls a print quality setting preset for each print purpose such as generic/DTP/graphic, and a toner density setting 904.

In the present embodiment, in the toner density setting 904, the toner density can be set at a numerical level. On the left side of the toner density setting 904, a button object for increasing or decreasing the toner density level from −8 to 8 by one level is displayed so as to be operable. On the right side of the toner density setting 904, a slide bar for setting the toner density is displayed so as to be operable. With the slide bar, the toner density can be adjusted by operating the slide object leftward or rightward. The level −8 is set when the slide object is at the leftmost position and the level 8 is set when the slide object is at the rightmost position. As described above, in the toner density setting 904, the toner density can be set in a total of 17 stages, from −8, which is the lowest density, to 8, which is the highest density. The example of FIG. 9 indicates that the toner density is −8, which is the lowest density.

<Control Modules>

Figure 10:
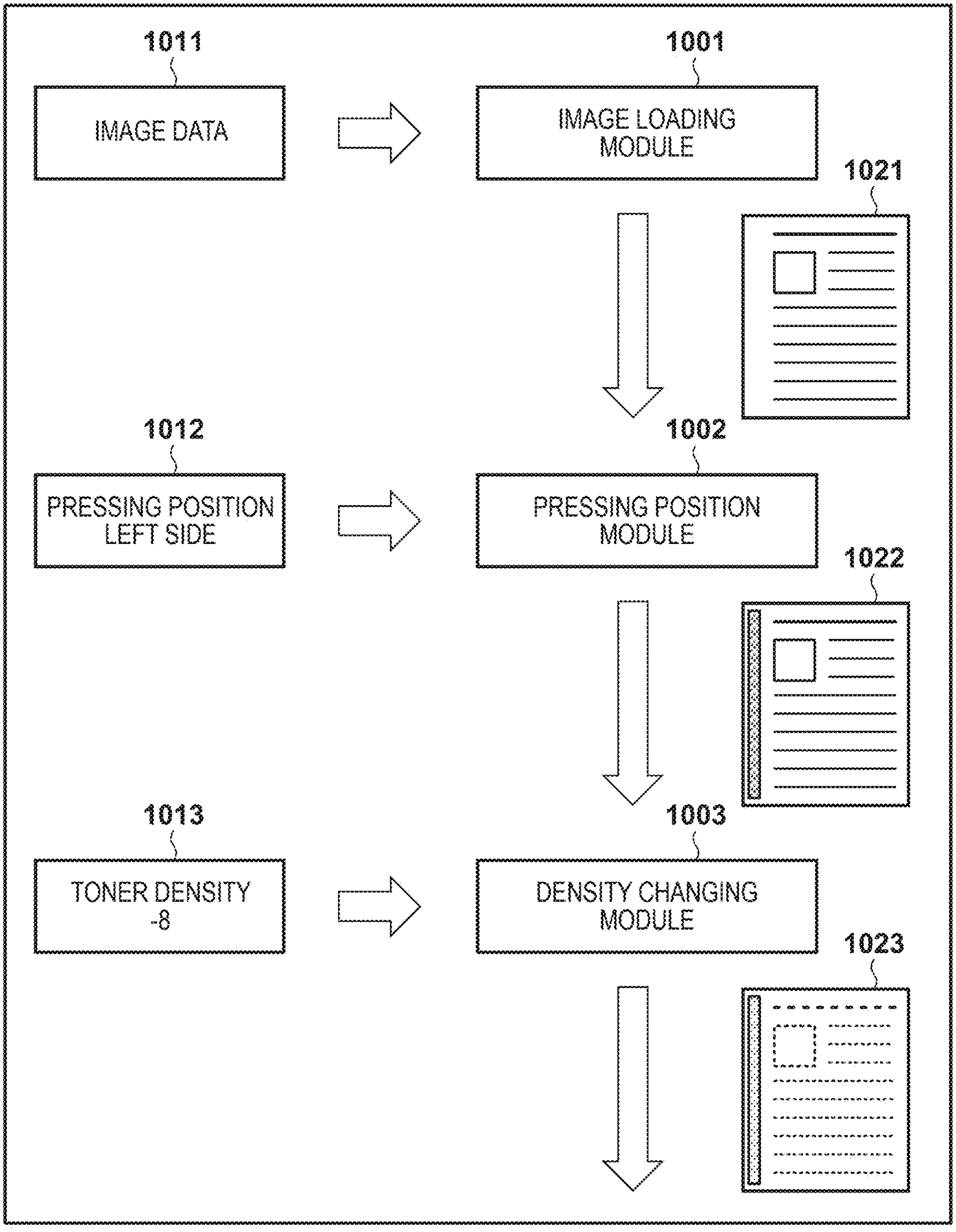
FIG. 10 is a schematic diagram of print images generated by each module according to an embodiment.

Referring to FIG. 10, various control modules executed by the CPU 200 of the image forming apparatus 1100 according to the present embodiment are described. Here, print images generated by the CPU 200 executing respective modules in a program stored in the ROM 201 are described. As modules for generating a print image, the image forming apparatus 1100 includes an image loading module 1001, a pressing position module 1002, and a density changing module 1003.

The image loading module 1001 loads image data 1011 in the print information transmitted to the image forming apparatus 1100 via the printer driver of the PC 100. The loaded image data 1011 is stored as a print image 1021 in the RAM 202 or the HDD 203 in the image forming apparatus 1100.

Subsequently, the pressing position module 1002 obtains the pressing position 1012 in the print information. In the example of FIG. 10, the pressing position is the left side of the sheet. This corresponds to the left side of the pressing position 721 of FIG. 7B. The pressing position module 1002 synthesizes the pressing marker on the left side of the pressing position with the print image 1021 loaded by the image loading module 1001, and generates a print image 1022.

Next, the density changing module 1003 acquires a toner density 1013 in the print information. In the example of FIG. 10, the toner density is −8. This corresponds to the toner density setting 904 of −8 of FIG. 9. The density changing module 1003 changes the toner density of the print image 1022 synthesized by the pressing position module 1002, and generates a print image 1023.

<Toner Density Control>

Figure 11:
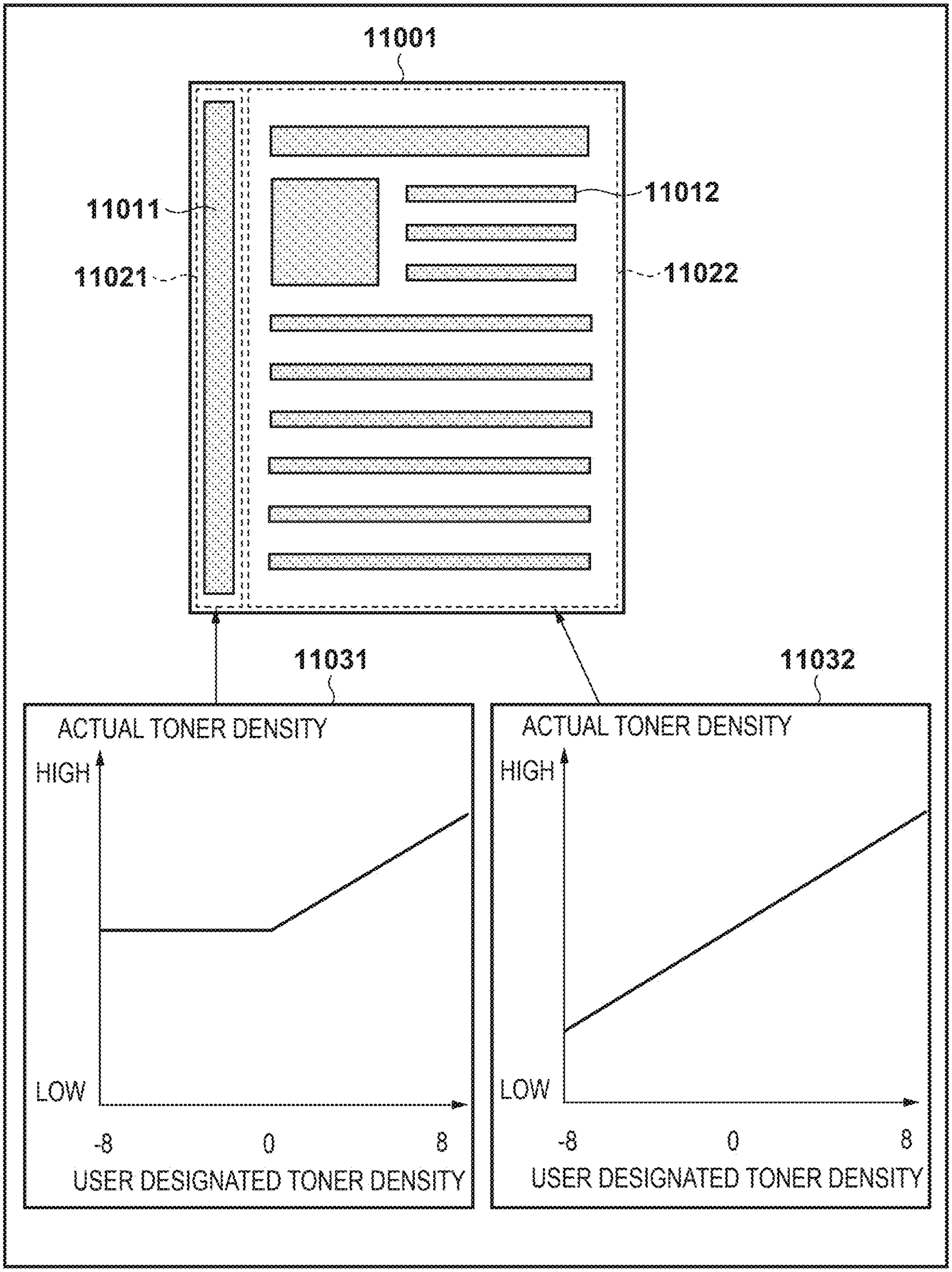
FIG. 11 illustrates a relationship between a print image and toner density change control according to an embodiment.

The toner density control for the print image 1022 executed by the density changing module 1003 are described with reference to FIG. 11.

A print image 11001 held in the RAM 202 or the HDD 203 includes a pressing marker (second image) 11011 and a body image (first image) 11012. The image for the body corresponds to the first image and the image for pressing corresponds to the second image. The print image 11001 holds information of a pressing marker area 11021 of the pressing marker 11011 and a body image area 11022 of the body image 11012. The density changing module 1003 controls different toner densities for the pressing marker area 11021 and the body image area 11022.

Pressing marker area toner density control 11031 is performed for the pressing marker area 11021. The pressing marker area toner density control 11031 controls the toner density setting 904 of the printer driver of the PC 100 so that the actual toner density is not decreased by a threshold value or more, using a predetermined threshold value as a limit. That is, the toner density control 11031 performs control to decrease the density down to a predetermined threshold value (lower limit) according to the setting, but performs control to not decrease the density beyond the predetermined threshold value. As a result, it is possible to prevent the pressing marker from being excessively thin and the pressure-bonding force from becoming weak.

Further, the body image area toner density control 11032 is performed for the body image area 11022. The body image area toner density control 11032 linearly controls the toner density in accordance with the toner density setting 904 of the printer driver of the PC 100 to provide a print quality product desired by the user. That is, unlike the pressing marker area 11021, the body image area 11022 controls the toner density according to the user setting without setting a lower limit.

<Print Control>

Figure 12:
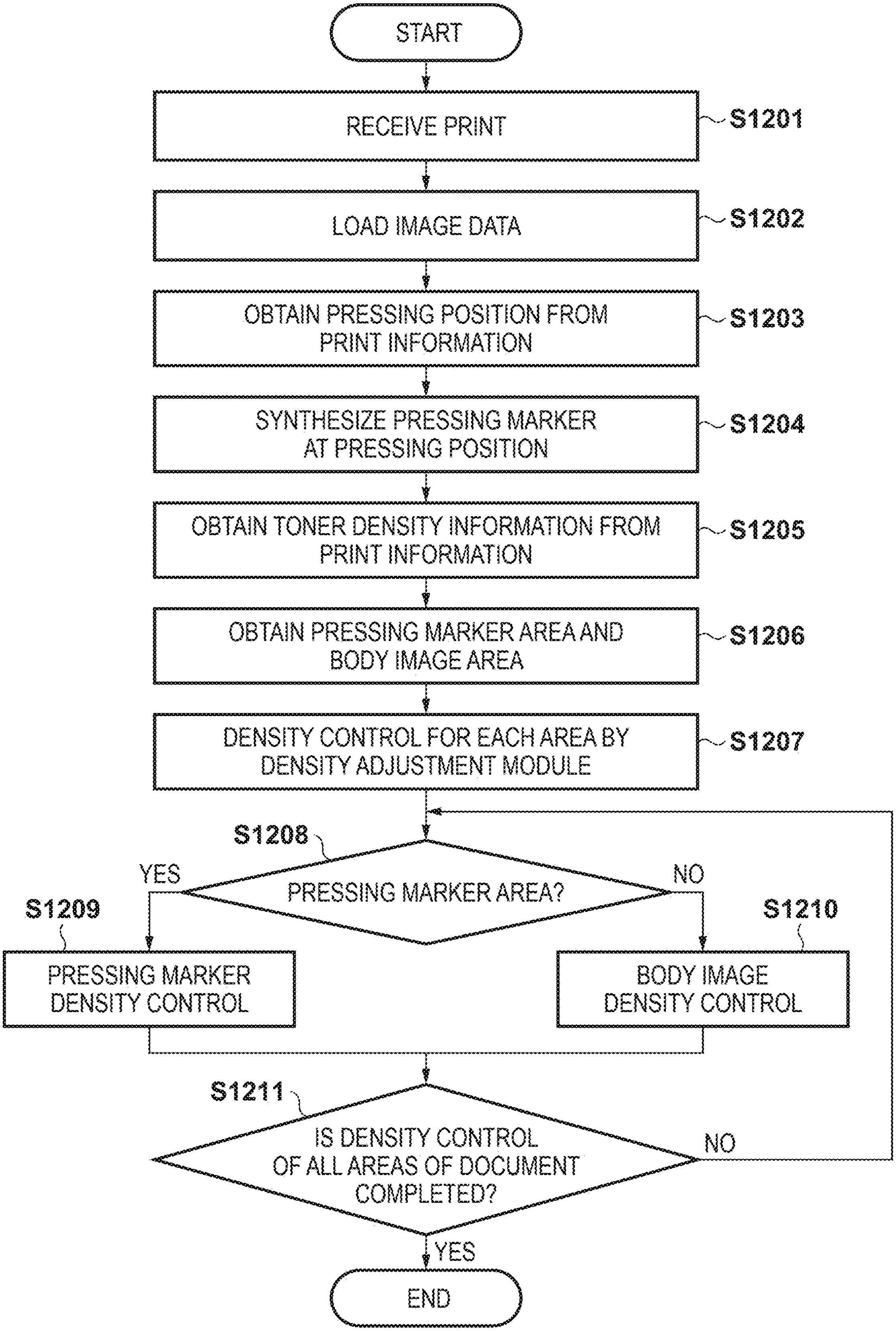
FIG. 12 is a flowchart according to an embodiment.

With reference to FIG. 12, a processing procedure for printing control by the image forming apparatus 1100 is described. The processing described below is realized by, for example, the CPU 200 of the image forming apparatus 1100 reading a program stored in the ROM 201 into the RAM 202 and executing the program.

In step S1201, the CPU 200 receives print information transmitted to the image forming apparatus 1100 via the printer driver of the PC 100, and proceeds to step S1202. In step S1202, the CPU 200 executes the image loading module 1001 to load image data from the print information received in step S1201 into the RAM 202 or the HDD 203, and proceeds to step S1203.

In step S1203, the CPU 200 executes the pressing position module 1002 to obtain information of the pressing position 1012 in the print information, and proceeds to step S1204. In step S1204, the CPU 200 executes the pressing position module 1002 to synthesize the pressing marker with the print image loaded in step S1202 at the pressing position and store the pressing marker area and the body image area in the print image, and proceeds to step S1205. In step S1205, the CPU 200 executes the density changing module 1003 to obtain the toner density 1013 in the print information, and proceeds to step S1206.

In step S1206, the CPU 200 executes the density changing module 1003 to obtain the pressing marker area and the body image area from the print image, and proceeds to step S1207. In step S1207, the CPU 200 executes the density changing module 1003 to execute the density control according to each area, and proceeds to step S1208. In step S1208, the CPU 200 executes the density changing module 1003 to determine whether the area where the density control is to be performed hereafter is the pressing marker area. In the case of the pressing marker area, the processing proceeds to step S1209, and in the case of the body image area, the processing proceeds to step S1210.

In step S1209, the CPU 200 executes the density changing module 1003 to perform pressing marker toner density control, and proceeds to step S1211. The pressing marker toner density control is the pressing marker area toner density control 11031 described with reference to FIG. 11. Meanwhile, in step S1210, the CPU 200 executes the density changing module 1003 to perform body image toner density control, and proceeds to step S1211. The pressing marker toner density control is the body image area toner density control 11032 described with reference to FIG. 11. In step S1211, the CPU 200 executes the density changing module 1003 to determine whether the density control of all the areas in the print image has been completed. If it is not completed, the processing returns to step S1208 to perform density control of the next area, and if the density control of all the areas is completed, the process of this flowchart is ended.

As described above, the image forming apparatus according to the present embodiment includes a process cartridge including a recording material, and an image former that forms a first image for text and a second image for pressing on a sheet using a recording material. Further, the image forming apparatus includes a sheet pressing unit that presses and binds sheets on which images have been formed every predetermined number of sheets. The image forming apparatus sets a density level of an image to be formed, and individually controls the density of the first image and the second image based on the set density level. As described above, according to the present embodiment, the density control is individually performed on each of the body image (the first image) and the pressing marker (the second image). For example, the image forming apparatus controls the density of the first image and the second image according to the set density level, and controls the density of the second image with a threshold value set in advance as a lower limit. The pressing marker area toner density control 11031 controls the toner density setting 904 of the printer driver of the PC 100 so that the actual toner density does not become lower than predetermined threshold value set as a lower limit. As a result, a minimum adhesive force (pressure-bonding force) can be ensured. As described above, according to the present embodiment, it is possible to control the density of the image formed by recording material and to advantageously bond a bundle of sheets by using recording material.

Second Embodiment

Hereinafter, a second embodiment of the present disclosure is described. In the above-described first embodiment, an example is given in which the pressing marker area toner density control 11031 controls the toner density setting 904 of the printer driver so that the actual toner density does not become a predetermined threshold value set as a lower limit or lower. This ensures a certain degree of adhesive force even while the toner density is changed. On the other hand, in the present embodiment, control to maintain a constant adhesive force without changing the adhesive force by the toner density control will be described.

<Toner Density Control>

Figure 13:
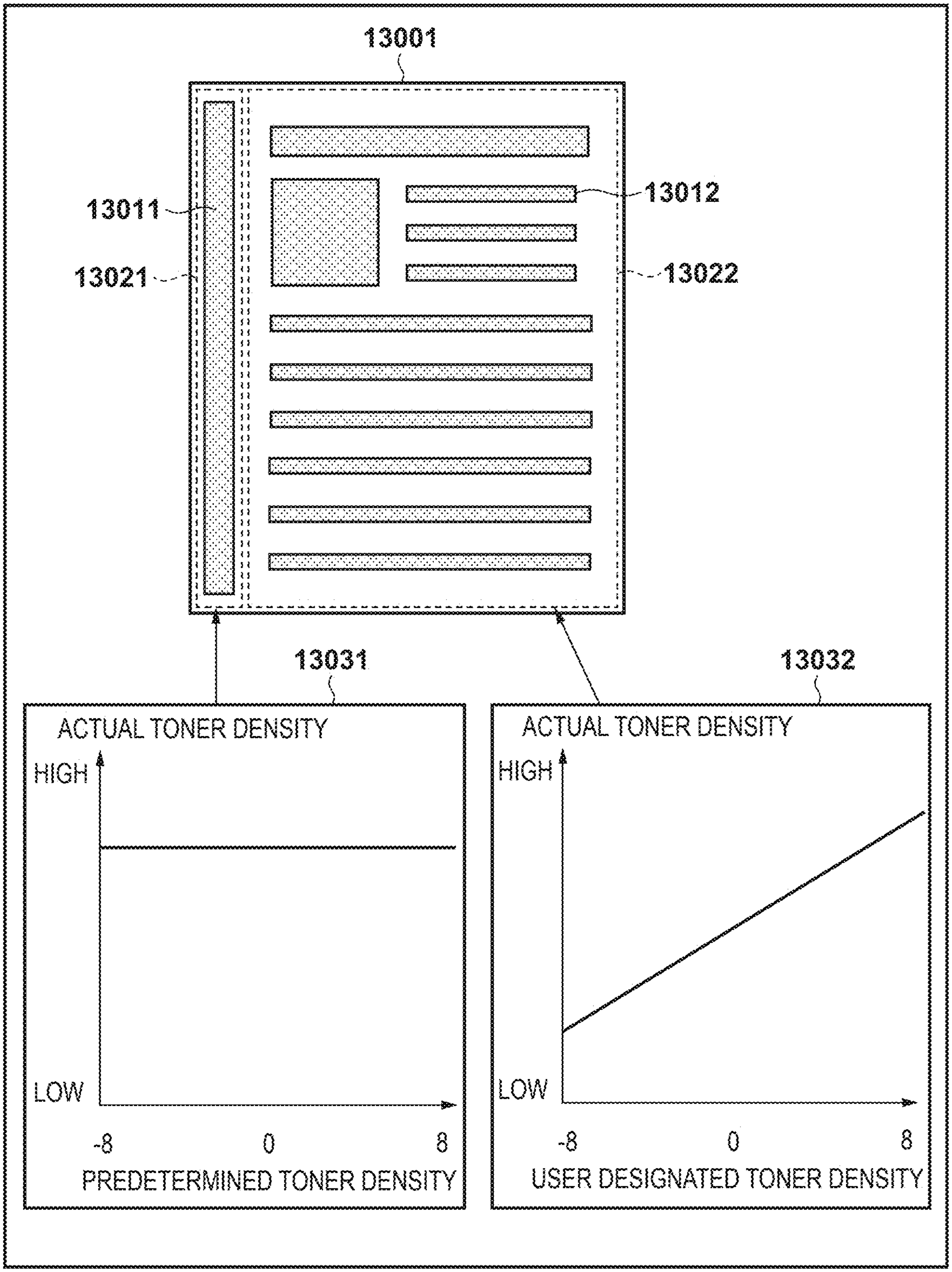
FIG. 13 illustrates a relationship between a print image and toner density change control according to an embodiment.

The toner density control for the print image 1022 executed by the density changing module 1003 according to the present embodiment is described with reference to FIG. 13.

A print image 13001 held in the RAM 202 or the HDD 203 is configured to include a pressing marker 13011 and a body image 13012. The print image 13001 holds information of a pressing marker area 13021 of the pressing marker 13011 and a body image area 13022 of the body image 13012. The density changing module 1003 controls different toner densities for the pressing marker area 13021 and the body image area 13022.

Pressing marker area toner density control 13031 is performed for the pressing marker area 13021. Pressing marker area toner density control 13031 controls so as to ensure a predetermined toner density value at all times irrespective of the toner density setting 904 of the printer driver of the PC 100. This prevents the pressure-bonding force from changing in accordance with the change in the toner density. Body image area toner density control 13032 is performed for the body image area 13022. The body image area toner density control 13032 linearly controls the toner density in accordance with the toner density setting 904 of the printer driver of the PC 100 to provide a print quality product desired by the user.

As described above, the image forming apparatus according to the present embodiment controls the density of the first image according to the set density level, and controls the density of the second image to a predetermined value regardless of the set density level. In this way, the pressing marker area toner density control 13031 controls so as to ensure a predetermined toner density value at all times irrespective of the toner density setting 904 of the printer driver of the PC 100. This prevents the pressure-bonding force from changing in accordance with the change in the toner density.

Third Embodiment

Hereinafter, a third embodiment of the present disclosure is described. Both the pressing marker area toner density control 11031 and the pressing marker area toner density control 13031 according to the above-described first embodiment and the above-described second embodiment are embodiments of control for determining whether or not the toner density setting 904 of the printer driver of the PC 100 is reflected in the toner density of the pressing marker. That is, the toner density control of the body image area and the pressing marker area is performed according to one set value. Therefore, the toner density of the body image and the toner density of the pressing unit cannot be set independently. For example, it is not possible to perform control such as that for when one wants the body image to be thin but, in order to increase the pressure-bonding force, also wants the toner density of the pressing unit to be high. Therefore, in the present embodiment, an example in which the toner density control is performed according to the individual setting value for each such area is described.

<Print Setting Screen>

Figure 14A:
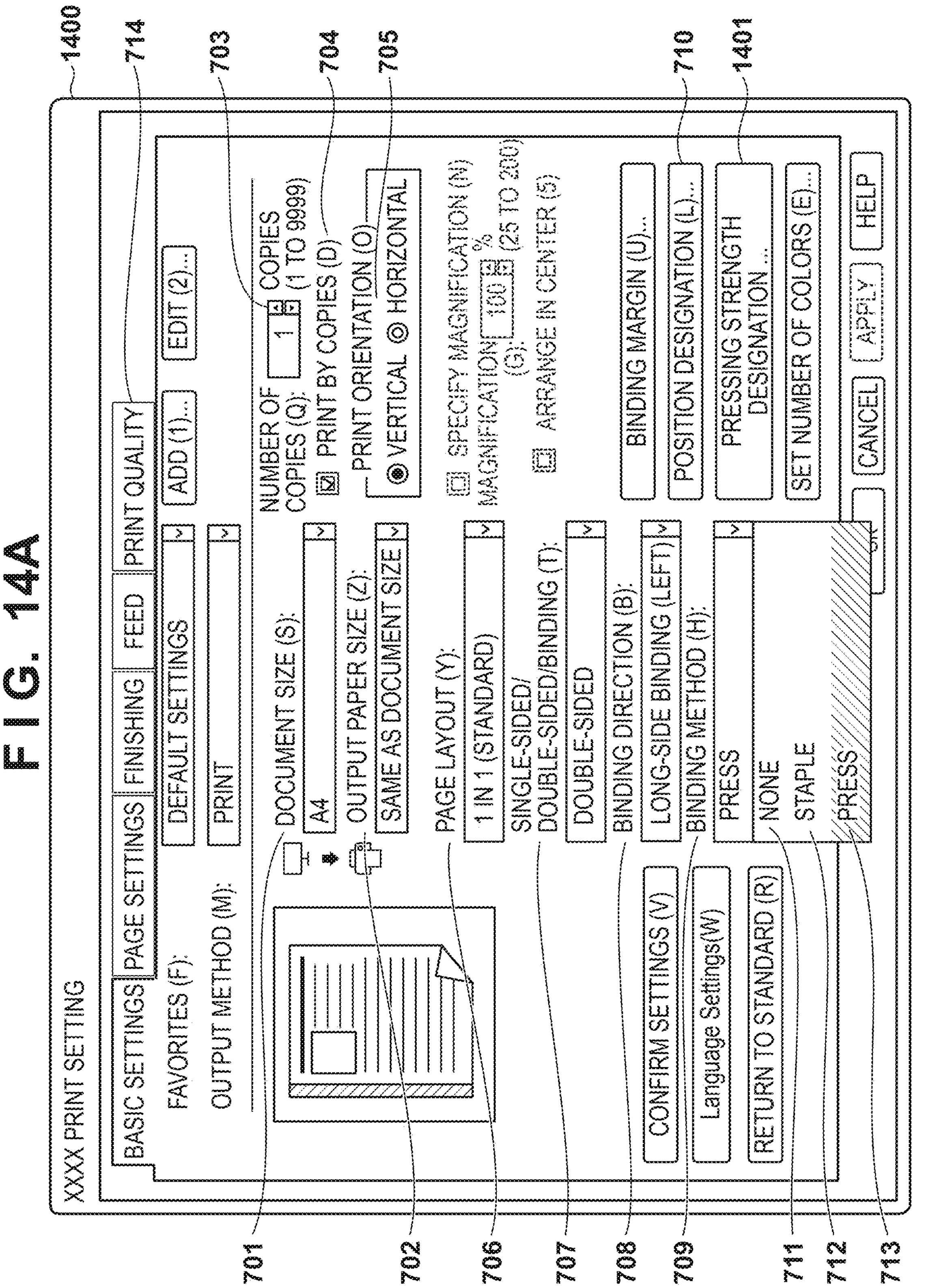
FIG. 14A to FIG. 14B are views illustrating a printer driver pressing strength designation according to an embodiment.
Figure 14B:
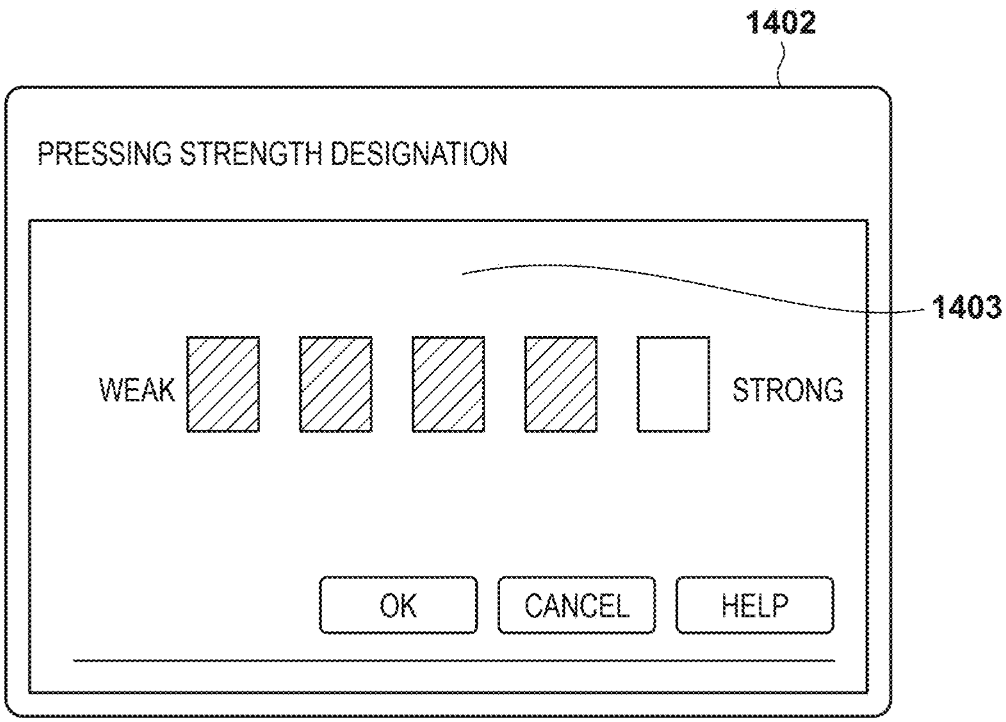

Referring to FIGS. 14A to 14B, an example of a print setting screen of the printer driver installed in the PC 100 according to the present embodiment is described. A print setting screen 1400 is displayed on a display device such as a display based on an instruction from the CPU, and the user performs print settings using an input device such as a mouse or a keyboard via the screen. The explanation regarding reference numerals 700 to 713 overlaps with that of the print setting screen 700 in FIG. 7A, and is not repeated here for conciseness.

FIG. 14A to FIG. 14B are views illustrating a printer driver pressing strength designation according to an embodiment. As illustrated in FIG. 14A, the print setting screen 1400 includes, in addition to the configurations of the print setting screen 700, a selection object for a pressing strength designation 1401. When the pressing strength designation 1401 is operated, a pressing strength designation dialog 1402 illustrated in FIG. 14B is displayed. The pressing strength designation dialog 1402 includes a pressing strength designation 1403 such that the strength of the pressing strength can be set. In this example, the pressing strength can be designated in five stages, and in FIG. 14B, it is illustrated that the pressing strength 4 is designated. As the designation method, when the operation unit is of the touch panel type, it is possible to set the pressing strength at a desired level by touch operation. Further, configuration may be taken to have an operation system in which, when using the left and right hardware key buttons, the pressing strength is lowered by one by one operation of the left key, and the pressing strength is increased by one by one operation of the right key. In addition, objects for left and right keys may be displayed on a screen so as to be operable, and setting may be performed by operating such left and right keys.

After the pressing strength is set, the set pressing strength can be finalized by operating an ok button, and the set pressing strength can be discarded by operating a cancel button.

<Toner Density Control>

Figure 15:
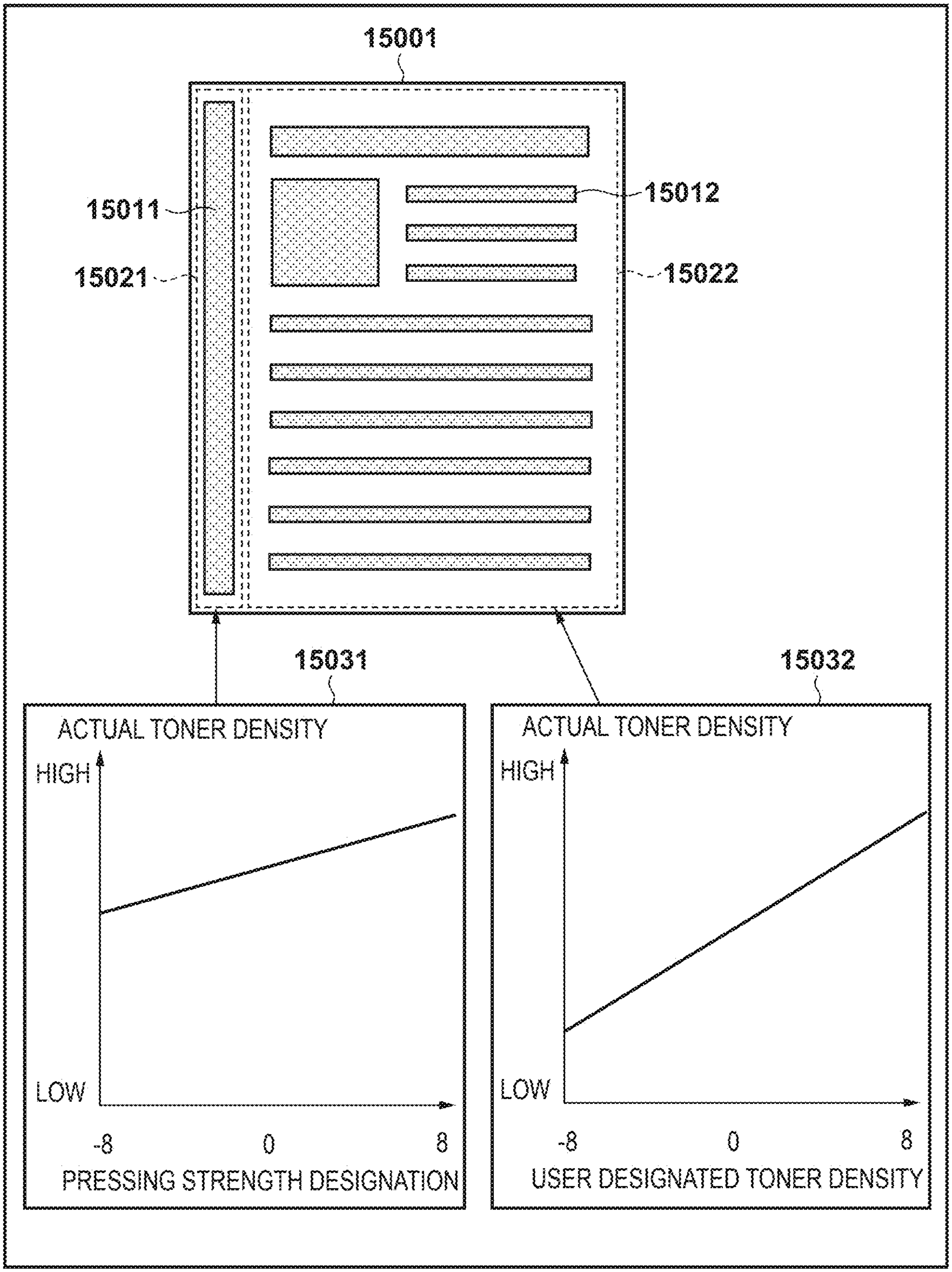
FIG. 15 illustrates a relationship between a print image and toner density change control according to an embodiment.

Toner density control for the print image 1022 executed by the density changing module 1003 according to the present embodiment is described with reference to FIG. 15, which illustrates a relationship between a print image and toner density change control according to an embodiment.

A print image 15001 held in the RAM 202 or the HDD 203 is configured to include a pressing marker 15011 and a body image 15012. The print image 15001 holds information of a pressing marker area 15021 of the pressing marker 15011 and a body image area 15022 of the body image 15012. The density changing module 1003 controls different toner densities for the pressing marker area 15021 and the body image area 15022.

Pressing marker area toner density control 15031 is performed for the pressing marker area 15021. The pressing marker area toner density control 15031 linearly controls the toner density based on the setting of the pressing strength designation 1403 of the printer driver of the PC 100 to realize the pressing strength desired by the user. Body image area toner density control 15032 is performed for the body image area 15022. The body image area toner density control 15032 linearly controls the toner density in accordance with the toner density setting 904 of the printer driver of the PC 100 to provide a print quality product desired by the user.

<Print Control>

Figure 16:
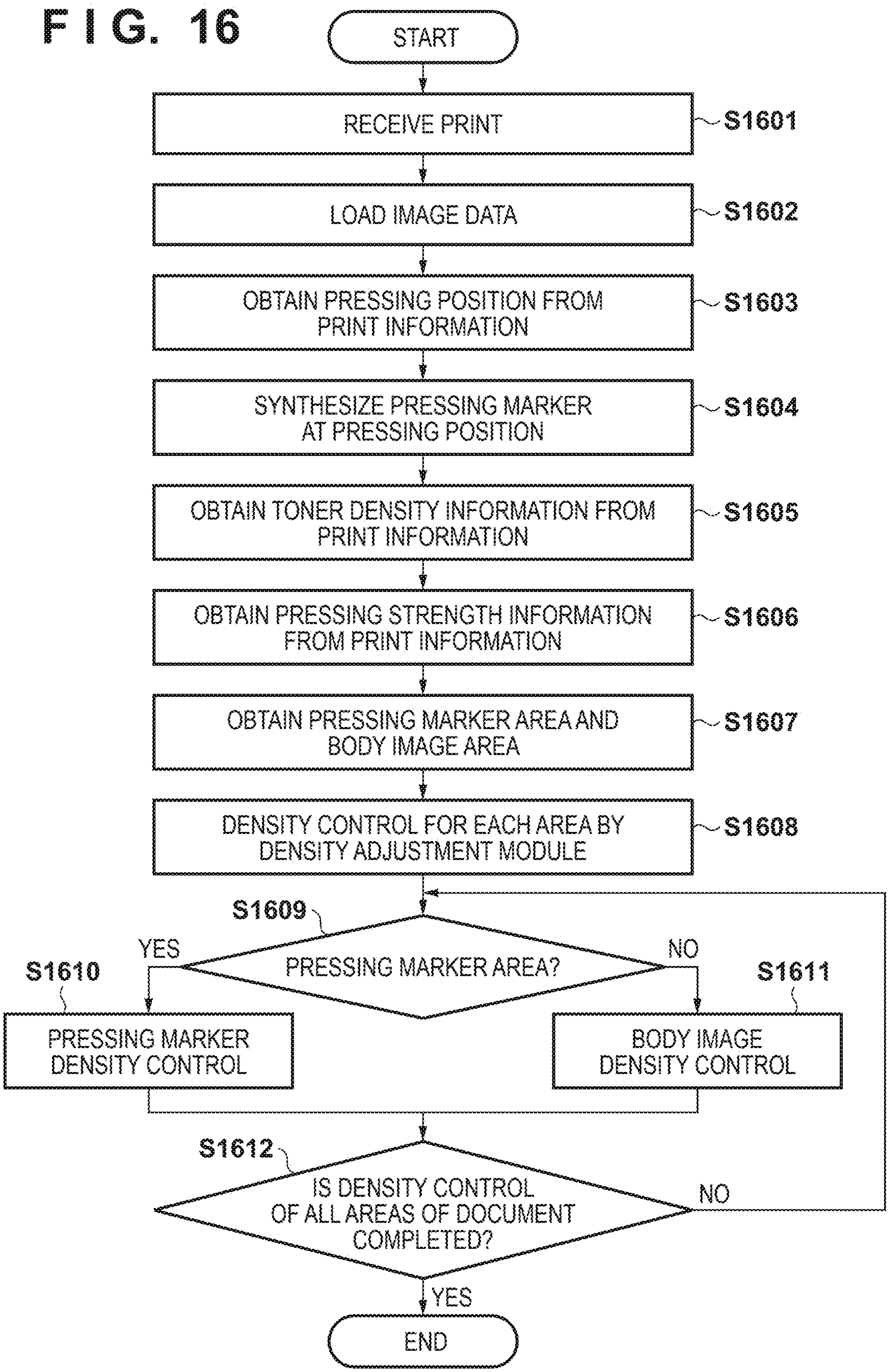
FIG. 16 is a flowchart according to an embodiment.

With reference to FIG. 16, a processing procedure for printing control by the image forming apparatus 1100 according to the present embodiment is described. The processing described below is realized by, for example, the CPU 200 of the image forming apparatus 1100 reading a program stored in the ROM 201 into the RAM 202 and executing the program.

In step S1601, the CPU 200 receives print information transmitted to the image forming apparatus 1100 via the printer driver of the PC 100, and proceeds to step S1602. In step S1602, the CPU 200 executes the image loading module 1001 to load image data from the print information received in step S1601 into the RAM 202 or the HDD 203, and proceeds to step S1603.

In step S1603, the CPU 200 executes the pressing position module 1002 to obtain information of the pressing position 1012 in the print information, and proceeds to step S1604. In step S1604, the CPU 200 executes the pressing position module 1002 to synthesize the pressing marker with the print image loaded in step S1602 at the pressing position and store the pressing marker area and the body image area in the print image, and proceeds to step S1605. In step S1605, the CPU 200 executes the density changing module 1003 to obtain the toner density (first density level) in the print information, and proceeds to step S1606. Here, the toner density corresponds to the toner density 904 of the printer driver of the PC 100.

In step S1606, the CPU 200 executes the density changing module 1003 to obtain the toner density (second density level) in the print information, and proceeds to step S1607. Here, the toner density corresponds to the setting of the pressing strength designation 1403 of the printer driver of the PC 100. In step S1607, the CPU 200 executes the density changing module 1003 to obtain the pressing marker area and the body image area from the print image, and proceeds to step S1608. In step S1608, the CPU 200 executes the density changing module 1003 to execute the density control according to each area, and proceeds to step S1609. In step S1609, the CPU 200 executes the density changing module 1003 to determine whether the area where the density control is to be performed hereafter is the pressing marker area. In the case of the pressing marker area, the processing proceeds to step S1610, and in the case of the body image area, the processing proceeds to step S1611.

In step S1610, the CPU 200 executes the density changing module 1003 to perform pressing marker toner density control, and proceeds to step S1612. The pressing marker toner density control is the pressing marker area toner density control 15031 described with reference to FIG. 15. Meanwhile, in step S1611, the CPU 200 executes the density changing module 1003 to perform body image toner density control, and proceeds to step S1612. The pressing marker toner density control is the body image area toner density control 15032 described with reference to FIG. 15. In step S1612, the CPU 200 executes the density changing module 1003 to determine whether the density control of all the areas in the print image has been completed. If it is not completed, the processing returns to step S1609 to perform density control of the next area, and if the density control of all the areas is completed, the process of this flowchart is ended.

As described above, the image forming apparatus according to the present embodiment sets the first density level corresponding to the first image and the second density level corresponding to the second image, respectively. Further, the image forming apparatus controls the density of the first image according to the first density level, and controls the density of the second image according to the second density level. In this way, since the toner densities of the body image and of the pressing unit can be set independently, it is possible to perform control such as that for when one wants the body image to be thin but, in order to increase the pressure-bonding force, also wants the toner density of the pressing unit to be high. Therefore, it is possible to achieve both the appearance of the body and the pressure-bonding force desired by the user.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-120926, filed Jul. 25, 2023, which is hereby incorporated by reference herein in its entirety.

What is claimed is:

1. An image forming apparatus, comprising:
- a process cartridge including a recording material;
- an image former configured to form, using a recording material, a first image for a body and a second image for adhesion on a sheet;
- a sheet bonder configured to bond together a predetermined number of sheets on which at least one image has been formed;
- at least one memory device configured to store a set of instructions; and
- at least one processor that executes the set of instructions to:
  - obtain a first density corresponding to the first image, the first density being determined based on a density level received from a user;
  - obtain a second density corresponding to the second image, the second density being determined based on the first density received from the user, wherein a higher first density is determined as the density level received from the user increases, wherein a higher second density is determined as the density level received from the user increases, wherein a lower second density is determined as the density level received from the user decreases, and wherein the first density is decreased beyond a predetermined density and the second density is not decreased beyond the predetermined density even if a density level lower than a predetermined density level is received from the user;
  - control a recording medium density of the first image in accordance with the first density; and
  - control a recording material density of the second image in accordance with the second density.

2. The image forming apparatus according to claim 1, wherein
- the at least one processor executes instructions stored in the at least one memory device to:
- control a density of the second image with a threshold value set in advance as a lower limit.

3. The image forming apparatus according to claim 1, wherein
- an area in which to form the second image is a long side or a short side of the sheet.

4. The image forming apparatus according to claim 1, wherein an area in which to form the second image can be set by a user input.

5. The image forming apparatus according to claim 1, wherein the image former is configured to form the second image by using a first recording material including an adhesive component among recording materials of a plurality of colors included in the process cartridge, and the image former is configured to form the first image by using at least one recording material out of the first recording material and another recording material different from the first recording material and not including an adhesive component, among the recording materials of the plurality of colors included in the process cartridge.

6. The image forming apparatus according to claim 5, wherein the first recording material is a black toner, and the another recording material includes a yellow toner, a magenta toner, and a cyan toner.

7. A method of controlling an image forming apparatus comprising a process cartridge including a recording material; an image former configured to form, using a recording material, a first image for a body and a second image for adhesion on a sheet; and a sheet bonder configured to bond together a predetermined number of sheets on which at least one image has been formed, the method comprising:

obtaining a first density corresponding to the first image, the first density being determined based on a density level received from a user;

obtaining a second density corresponding to the second image, the second density being determined based on the first density received from the user, wherein a higher first density is determined as the density level received from the user increases, wherein a higher second density is determined as the density level received from the user increases, wherein a lower second density is determined as the density level received from the user decreases, and wherein the first density is decreased beyond a predetermined density and the second density is not decreased beyond the predetermined density even if a density level lower than a predetermined density level is received from the user;

controlling a recoding medium density of the first image in accordance with the first density; and controlling a recoding medium density of the second image in accordance with the second density.

8. A non-transitory storage medium storing a program for causing a computer to execute a method of controlling an image forming apparatus comprising a process cartridge including a recording material; an image former configured to form, using a recoding material, a first image for a body and a second image for adhesion on a sheet; and a sheet bonder configured to bond together a predetermined number of sheets on which at least one image has been formed, the method comprising:

obtaining a first density corresponding to the first image, the first density being determined based on a density level received from a user;

obtaining a second density corresponding to the second image, the second density being determined based on the first density received from the user, wherein a higher first density is determined as the density level received from the user increases, wherein a higher second density is determined as the density level received from the user increases, wherein a lower second density is determined as the density level received from the user decreases, and wherein the first density is decreased beyond a predetermined density and the second density is not decreased beyond the predetermined density even if a density level lower than a predetermined density level is received from the user;

controlling a recoding medium density of the first image in accordance with the first density; and controlling a recoding medium density of the second image in accordance with the second density.

* * * * *